US010805951B2

(12) United States Patent
Li et al.

(10) Patent No.: US 10,805,951 B2
(45) Date of Patent: Oct. 13, 2020

(54) CONTROL INFORMATION PROCESSING METHOD, BASE STATION, AND TERMINAL

(71) Applicant: Huawei Technologies Co., Ltd., Shenzhen (CN)

(72) Inventors: Yuan Li, Beijing (CN); Lei Guan, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/184,472

(22) Filed: Nov. 8, 2018

(65) Prior Publication Data
US 2019/0075592 A1 Mar. 7, 2019

Related U.S. Application Data

(63) Continuation of application No. PCT/CN2016/081462, filed on May 9, 2016.

(51) Int. Cl.
*H04W 72/04* (2009.01)
*H04W 16/14* (2009.01)
(Continued)

(52) U.S. Cl.
CPC ......... *H04W 74/006* (2013.01); *H04W 16/14* (2013.01); *H04W 24/02* (2013.01); *H04W 72/12* (2013.01); *H04W 74/0808* (2013.01)

(58) Field of Classification Search
CPC ... H04W 74/006; H04W 16/14; H04W 24/02; H04W 72/042; H04W 72/12;
(Continued)

(56) References Cited

U.S. PATENT DOCUMENTS

2010/0098006 A1* 4/2010 Golitschek Edler Von Elbwart ............... H04L 1/1861
370/329

2010/0303011 A1* 12/2010 Pan .................. H04L 5/0007
370/328
(Continued)

FOREIGN PATENT DOCUMENTS

CN 101572896 A 11/2009
CN 103026677 A 4/2013
(Continued)

OTHER PUBLICATIONS

"Discussion on PUSCH design for eLAA UL," 3GPP TSG RAN WG1 Meeting #84bis, R1-162799, XP051079690m Busan, Korea, pp. 1-4, 3rd Generation Partnership Project—Valbonne, France (Apr. 11-15, 2016).
(Continued)

*Primary Examiner* — Rebecca E Song
*Assistant Examiner* — Vanneilian Lalchinthang
(74) *Attorney, Agent, or Firm* — Leydig, Voit & Mayer, Ltd.

(57) ABSTRACT

A control information processing method, a base station, and a terminal are provided. A base station determines jointly encoded control information for an uplink subframe, where the jointly encoded control information is control information obtained by jointly encoding first control information and second control information; and the base station sends the jointly encoded control information. A terminal receives jointly encoded control information sent by a base station, where the jointly encoded control information is for an uplink subframe, and is control information obtained by jointly encoding first control information and second control information; and the terminal performs clear channel assessment CCA based on the jointly encoded control information, and occupies, after finishing the CCA, the uplink subframe to send a signal. According to the present invention, control signaling overheads can be reduced.

17 Claims, 7 Drawing Sheets

(51) Int. Cl.
*H04W 74/00* (2009.01)
*H04W 72/12* (2009.01)
*H04W 24/02* (2009.01)
*H04W 74/08* (2009.01)

(58) Field of Classification Search
CPC .............. H04W 74/0808; H04L 1/1854; H04L 1/1861; H04L 27/0006; H04L 5/0044
USPC .......................................................... 370/329
See application file for complete search history.

(56) References Cited

U.S. PATENT DOCUMENTS

| | | | | |
|---|---|---|---|---|
| 2011/0058505 | A1* | 3/2011 | Pan | H04J 11/005 370/280 |
| 2011/0110441 | A1* | 5/2011 | Chen | H04L 5/0007 375/260 |
| 2015/0085797 | A1* | 3/2015 | Ji | H04J 3/16 370/329 |
| 2016/0119928 | A1* | 4/2016 | Wu | H04L 5/001 370/329 |
| 2016/0278050 | A1* | 9/2016 | Nory | H04W 16/14 |
| 2017/0325258 | A1* | 11/2017 | Nogami | H04J 11/00 |
| 2018/0103458 | A1* | 4/2018 | Tooher | H04W 16/14 |

FOREIGN PATENT DOCUMENTS

| | | |
|---|---|---|
| CN | 105307180 A | 2/2016 |
| CN | 105556888 A | 5/2016 |

OTHER PUBLICATIONS

"Discussion on UL Scheduling for LAA," 3GPP TSG RAN WG1 Meeting #84bis, Busan, Korea, XP051079540 R1-162322, pp. 1-6, 3rd Generation Partnership Project—Valbonne, France (Apr. 11-15, 2016).

"Discussion on LBT for self-carrier scheduling," 3GPP TSG RAN WG1 Meeting #84bis, R1-162671, Busan, Korea, pp. 1-5, 3GPP—3rd Generation Partnership Project—Valbonne, France (Apr. 11-15, 2016).

"3rd Generation Partnership Project; Technical Specification Group Radio Access Network; Evolved Universal Terrestrial Radio Access (E-UTRA); Physical layer procedures (Release 13)," 3GPP TS 36.213 V13.1.1, pp. 1-361, 3GPP—3rd Generation Partnership Project—Valbonne, France (Mar. 2016).

"3rd Generation Partnership Project; Technical Specification Group Radio Access Network; Evolved Universal Terrestrial Radio Access (E-UTRA); Multiplexing and channel coding (Release 13)," 3GPP TS 36.212 V13.1.0, pp. 1-129, 3GPP—3rd Generation Partnership Project—Valbonne, France (Mar. 2016).

3rd Generation Partnership Project; Technical Specification Group Radio Access Network; Evolved Universal Terrestrial Radio Access (E-UTRA); Physical channels and modulation (Release 13), 3GPP TS 36.211 V13.1.0, pp. 1-155, 3GPP—3rd Generation Partnership Project—Valbonne, France (Mar. 2016).

* cited by examiner

CONTROL INFORMATION PROCESSING METHOD, BASE STATION, AND TERMINAL

CROSS-REFERENCE TO RELATED APPLICATIONS

This application is a continuation of International Application No. PCT/CN2016/081462, filed on May 9, 2016, the disclosure of which is hereby incorporated by reference in its entirety.

TECHNICAL FIELD

Embodiments of the present invention relate to the field of communications technologies, and in particular, to a control information processing method, a base station, and a terminal.

BACKGROUND

With development of communications technologies, a licensed-assisted access using Long Term Evolution (LAA-LTE) system may carry some data services by using an unlicensed spectrum.

Data transmission performed by the LAA-LTE on the unlicensed spectrum encounters co-channel interference from different operators and different wireless communications standards, for example, co-channel interference from a Wireless Fidelity (WiFi) system. To avoid severe impact of co-channel interference on transmission performance, the LAA-LTE system usually detects a communication channel through clear channel assessment (CCA) by using a listen before talk (LBT) channel access mechanism.

Currently, uplink transmission of the LAA-LTE system is finished by a base station through scheduling. A terminal sends uplink information in a scheduled uplink subframe based on control information used by the base station to schedule the terminal to send an uplink subframe. Before sending the uplink information, the terminal may perform LBT, or may not perform LBT. If the terminal performs the LBT, the terminal may perform single timeslot-based CCA or random backoff-based CCA.

To reduce an LBT waiting time of the terminal for uplink transmission, the terminal may not need to perform the random backoff-based CCA within a maximum channel occupancy time (MCOT) initiated by the base station, but performs the single timeslot-based CCA. If it is detected that a channel is idle, an uplink channel is accessed. The random backoff-based CCA needs to be performed for an uplink subframe falling beyond a range of the MCOT. A length of the MCOT initiated by the base station varies with a downlink service type, and ranges from 2 ms to 10 ms. The MCOT is initiated by the base station, and the terminal does not know a starting time of the MCOT and the length of the MCOT. Therefore, an easy-to-implement method for enabling the terminal to determine a type of the CCA and a length of the uplink subframe is that the base station separately notifies the terminal of the type of the CCA and a starting time of the uplink subframe.

An indication state used when the base station notifies the terminal of the starting time of the uplink subframe includes 0, 16 μs, 25 μs, or 1 symbol. 0 represents that the LBT does not need to be performed, and the terminal (e.g., a user equipment (UE)) occupies a first symbol of the uplink subframe. 16 μs represents that the UE does not need to perform the LBT, spares the first 16 μs of the first symbol of the uplink subframe, and occupies a part of the first symbol after the 16 μs of the first symbol and remaining symbols after the first symbol to send the uplink information. 25 μs represents that the UE spares the first 25 μs of the first symbol of the uplink subframe, performs the single timeslot-based CCA within the 25 μs, and if the LBT succeeds, occupies the second half of the first symbol and remaining symbols after the first symbol to send the uplink information. 1 symbol represents that the UE spares the first symbol of the uplink subframe, performs the random backoff-based CCA within the 1 symbol, and if the LBT succeeds, occupies remaining symbols after the first symbol to send the uplink information. If the base station separately notifies the terminal of the starting time of the uplink subframe and the type of the CCA at the same time, the base station adds all combinations of the type of the CCA and the indication state for the starting time of the uplink subframe to indication information. Because matching between 16 μs and the single timeslot-based CCA, matching between 16 μs and the random backoff-based CCA, and matching between 25 μs and the random backoff-based CCA do not occur, redundancy occurs in the indication information, and consequently control signaling overheads are increased.

SUMMARY

Embodiments of the present invention provide a control information processing method, a base station, and a terminal, so as to reduce control signaling overheads.

According to a first aspect, a control information processing method is provided. In the method, a base station sends jointly encoded control information after using a joint encoding manner to jointly encode different control information used to perform different scheduling on a terminal, so as to avoid a problem of control signaling overheads caused by separately sending the different control information, and reduce control signaling overheads.

In a possible design, the base station determines and sends jointly encoded control information for an uplink subframe, where the jointly encoded control information is control information obtained by jointly encoding first control information and second control information. The terminal receives the jointly encoded control information, performs clear channel assessment CCA based on the jointly encoded control information, and occupies, after finishing the CCA, the uplink subframe to send a signal, so as to reduce control signaling overheads.

In this embodiment of the present invention, message content indicated by the first control information and message content indicated by the second control information may not overlap, but have an association relationship.

In a possible implementation, a type of the CCA and a listening parameter of random backoff-based CCA may be jointly encoded. When the type of the CCA and the listening parameter of the random backoff-based CCA are jointly encoded, the first control information includes the type of the clear channel assessment CCA to-be-performed by the terminal in the uplink subframe, and the second control information includes the listening parameter of the random backoff-based CCA to-be-performed by the terminal. The listening parameter of the random backoff-based CCA includes a contention window size CWS or a backoff counter initial value.

Specifically, jointly encoded first control information and second control information is used to indicate one of the following situations: the first control information instructs the terminal to perform single timeslot-based CCA for the uplink subframe, and the second control information is null;

and the first control information instructs the terminal to perform the random backoff-based CCA for the uplink subframe, and the second control information indicates the listening parameter of the random backoff-based CCA.

Further, jointly encoded first control information and second control information is used to further indicate the following situation: the first control information instructs the terminal to skip performing listen before talk LBT, and occupies the uplink subframe to send a signal, and the second control information is null.

In another possible implementation, a starting time for sending a signal in the uplink subframe and the type of the CCA to-be-performed by the terminal may be jointly encoded. When the starting time for sending a signal in the uplink subframe and the type of the clear channel assessment CCA to-be-performed by the terminal are jointly encoded, the first control information includes the starting time when the terminal starts to send a signal in the uplink subframe, and the second control information includes the type of the CCA to-be-performed by the terminal.

Specifically, jointly encoded first control information and second control information is used to indicate one of the following situations:

the first control information indicates that the starting time when the terminal starts to send a signal in the uplink subframe is after a starting time of the uplink subframe, and an interval between the starting time for sending a signal and the starting time of the uplink subframe is a first time; and the second control information instructs the terminal to perform single timeslot-based CCA before the starting time for sending a signal;

the first control information indicates that the starting time when the terminal starts to send a signal in the uplink subframe is after a starting time of the uplink subframe, and an interval between the starting time for sending a signal and the starting time of the uplink subframe is a second time; and the second control information instructs the terminal to perform random backoff-based CCA before the starting time for sending a signal;

the first control information indicates that the starting time when the terminal starts to send a signal in the uplink subframe is the same as a starting time of the uplink subframe, and the second control information instructs the terminal to perform single timeslot-based CCA before the starting time for sending a signal; and the first control information indicates that the starting time when the terminal starts to send a signal in the uplink subframe is the same as a starting time of the uplink subframe, and the second control information instructs the terminal to perform random backoff-based CCA before the starting time for sending a signal.

Further, jointly encoded first control information and second control information is used to further indicate the following situation:

the first control information indicates that the starting time when the terminal starts to send a signal in the uplink subframe is after a starting time of the uplink subframe, and an interval between the starting time for sending a signal and the starting time of the uplink subframe is a third time; and the second control information instructs the terminal to skip performing listen before talk LBT, and occupies the uplink subframe to send a signal.

In still another possible implementation, the starting time for sending a signal in the uplink subframe, the type of the CCA, and the listening parameter of the random backoff-based CCA may be jointly encoded. When the starting time for sending a signal in the uplink subframe, the type of the CCA, and the listening parameter of the random backoff-based CCA are jointly encoded, the first control information includes the starting time when the terminal starts to send a signal in the uplink subframe, and the second control information includes the type of the clear channel assessment CCA to-be-performed by the terminal and the listening parameter of the random backoff-based CCA to-be-performed by the terminal. The listening parameter of the random backoff-based CCA includes the contention window size (CWS) or the backoff counter initial value.

Specifically, jointly encoded first control information and second control information is used to indicate one of the following situations:

the first control information indicates that the starting time when the terminal starts to send a signal in the uplink subframe is after a starting time of the uplink subframe, and an interval between the starting time for sending a signal and the starting time of the uplink subframe is a fourth time; and the second control information instructs the terminal to perform single timeslot-based CCA before the starting time for sending a signal;

the first control information indicates that the starting time when the terminal starts to send a signal in the uplink subframe is after a starting time of the uplink subframe, and an interval between the starting time for sending a signal and the starting time of the uplink subframe is a fifth time; and the second control information instructs the terminal to perform the random backoff-based CCA before the starting time for sending a signal, and indicates the listening parameter of the random backoff-based CCA;

the first control information indicates that the starting time when the terminal starts to send a signal in the uplink subframe is the same as a starting time of the uplink subframe, and the second control information instructs the terminal to perform single timeslot-based CCA before the starting time for sending a signal; and the first control information indicates that the starting time when the terminal starts to send a signal in the uplink subframe is the same as a starting time of the uplink subframe, and the second control information instructs the terminal to perform the random backoff-based CCA before the starting time for sending a signal, and indicates the listening parameter of the random backoff-based CCA.

In this embodiment of the present invention, the jointly encoded control information is sent, so that a problem that the type of the CCA to-be-performed by the terminal cannot be explicitly indicated in some scenarios when the starting time of the uplink subframe or the type of the CCA is separately notified can be resolved.

Further, jointly encoded first control information and second control information is used to further indicate the following situation: the first control information indicates that the starting time when the terminal starts to send a signal in the uplink subframe is after a starting time of the uplink subframe, and an interval between the starting time for sending a signal and the starting time of the uplink subframe is a sixth time; and the second control information instructs the terminal to skip performing listen before talk LBT, and occupies the uplink subframe to send a signal, and message content of the listening parameter of the random backoff-based CCA is null.

In another possible design, if the first control information indicates that the starting time when the terminal starts to send a signal in the uplink subframe is the same as the starting time of the uplink subframe, and the second control information instructs the terminal to perform the single timeslot-based CCA before the starting time for sending a signal, if the terminal occupies a channel before the starting time of the uplink subframe to send a signal until the starting time of the uplink subframe, the terminal sends a signal at the starting time of the uplink subframe; or if the terminal does not occupy a channel before the starting time of the uplink subframe to send a signal until the starting time of the uplink subframe, the terminal performs the single timeslot-based CCA before the starting time of the uplink subframe, and when LBT succeeds, sends a signal at the starting time of the uplink subframe.

In another possible design, if the first control information indicates that the starting time when the terminal starts to send a signal in the uplink subframe is the same as the starting time of the uplink subframe, and the second control information instructs the terminal to perform the random backoff-based CCA before the starting time for sending a signal, if the terminal occupies a channel before the starting time of the uplink subframe to send a signal until the starting time of the uplink subframe, the terminal sends a signal at the starting time of the uplink subframe; or if the terminal does not occupy a channel before the starting time of the uplink subframe to send a signal until the starting time of the uplink subframe, the terminal performs the random backoff-based CCA before the starting time of the uplink subframe, and when LBT succeeds, sends a signal at the starting time of the uplink subframe.

In another possible design, if the first control information indicates that the starting time when the terminal starts to send a signal in the uplink subframe is the same as the starting time of the uplink subframe, and the second control information instructs the terminal to perform the single timeslot-based CCA before the starting time for sending a signal, if the terminal occupies a channel before the starting time of the uplink subframe to send a signal until the starting time of the uplink subframe, the terminal sends a signal at the starting time of the uplink subframe; or if the terminal does not occupy a channel before the starting time of the uplink subframe to send a signal until the starting time of the uplink subframe, the terminal performs the single timeslot-based CCA before the starting time of the uplink subframe, and when LBT succeeds, sends a signal at the starting time of the uplink subframe.

In another possible design, if the first control information indicates that the starting time when the terminal starts to send a signal in the uplink subframe is the same as the starting time of the uplink subframe, and the second control information instructs the terminal to perform the random backoff-based CCA before the starting time for sending a signal, and indicates the listening parameter of the random backoff-based CCA, if the terminal occupies a channel before the starting time of the uplink subframe to send a signal until the starting time of the uplink subframe, the terminal sends a signal at the starting time of the uplink subframe; or if the terminal does not occupy a channel before the starting time of the uplink subframe to send a signal until the starting time of the uplink subframe, the terminal performs the random backoff-based CCA before the starting time of the uplink subframe, and when LBT succeeds, sends a signal at the starting time of the uplink subframe.

In this embodiment of the present invention, a terminal behavior that cannot occur in a combination of at least two pieces of control information is removed from the jointly encoded control information, so as to avoid signaling redundancy caused by separately notifying the terminal of the at least two pieces of control information at the same time, and improve control information transmission efficiency.

According to a second aspect, a base station is provided. The base station has a function of implementing the base station in the foregoing method design, and the function may be implemented by hardware, or may be implemented by hardware by executing corresponding software. The hardware or the software includes one or more modules corresponding to the function. The module may be software and/or hardware.

In a possible design, the base station includes a processing unit and a sending unit. The processing unit is configured to determine jointly encoded control information for an uplink subframe, where the jointly encoded control information is control information obtained by jointly encoding first control information and second control information. The sending unit is configured to send the jointly encoded control information determined by the processing unit.

In another possible design, the base station includes a processor and a transmitter. The processor is configured to support the base station in implementing corresponding functions in the foregoing method. The processor is configured to determine jointly encoded control information for an uplink subframe. The transmitter is configured to have the capability to send the jointly encoded control information, to support communication with a terminal. The base station may further include a memory, where the memory is configured to couple to the processor and store a program instruction and data that are necessary for the base station.

According to a third aspect, a terminal is provided. The terminal has a function of implementing the terminal in the foregoing method design, and the function may be implemented by hardware, or may be implemented by hardware by executing corresponding software. The hardware or the software includes one or more modules corresponding to the function. The module may be software and/or hardware.

In a possible design, the terminal includes a receiving unit, a processing unit, and a sending unit. The receiving unit is configured to receive jointly encoded control information sent by a base station, where the jointly encoded control information is for an uplink subframe, and is control information obtained by jointly encoding first control information and second control information. The processing unit is configured to perform clear channel assessment CCA based on the jointly encoded control information. The sending unit is configured to occupy, after the processing unit finishes the CCA, the uplink subframe to send a signal.

In another possible design, the terminal includes a receiver, a processor, and a transmitter. The processor is configured to support the terminal in implementing corresponding functions in the foregoing method. The receiver is configured to have the capability to receive jointly encoded control information sent by a base station. The transmitter is configured to have the capability to transmit a signal. The terminal may further include a memory, where the memory is configured to couple to the processor and store a program instruction and data that are necessary for the terminal.

According to the control information processing method, the base station, and the terminal provided in the embodiments of the present invention, the base station sends the jointly encoded control information after using the joint encoding manner to jointly encode different control information. After receiving the jointly encoded control information, the terminal performs the CCA based on the jointly encoded control information, and sends a signal in the uplink subframe, so as to avoid signaling redundancy caused by separately notifying the terminal of at least two pieces of control information at the same time, and improve control information transmission efficiency.

DESCRIPTION OF EMBODIMENTS

Figure 1:
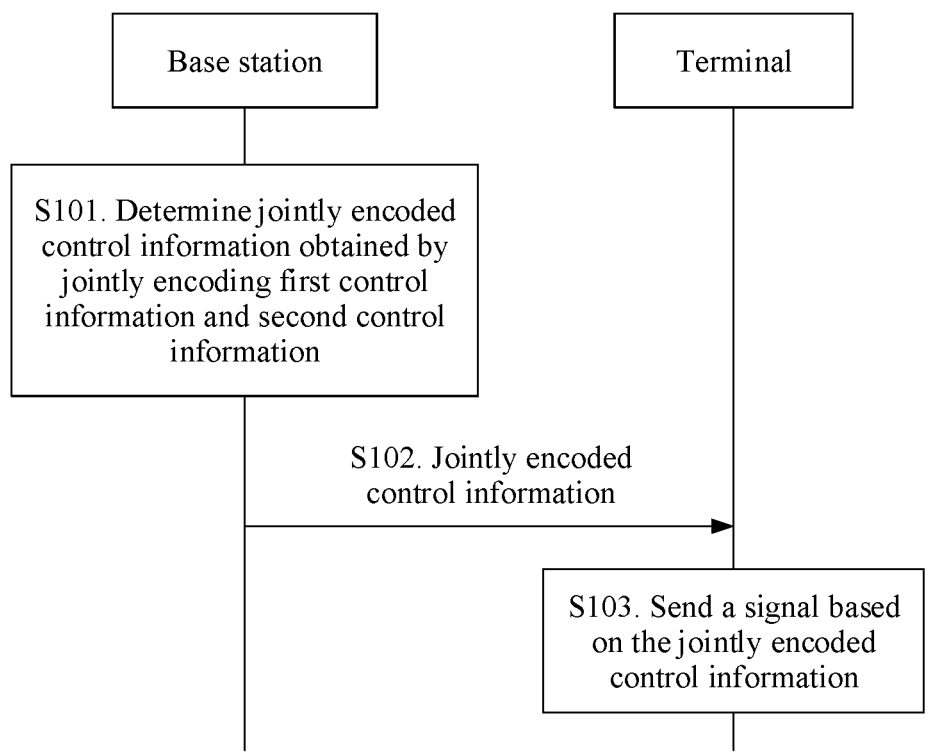
FIG. 1 is a flowchart of implementing a control information processing method according to an embodiment of the present invention.

The following describes the technical solutions in the embodiments of the present invention in detail with reference to the accompanying drawings in the embodiments of the present invention.

A control information processing method, a base station, and a terminal provided in the embodiments of the present invention may be applied to a wireless communications system operating on an unlicensed spectrum, for example, an LAA-LTE communications system or an enhanced licensed-assisted access (eLAA) communications system. The base station in the wireless communications system sends downlink information on the unlicensed spectrum, and the terminal in the wireless communications system sends uplink information on the unlicensed spectrum. The terminal sends the uplink information on the unlicensed spectrum based on scheduling of the base station. Specifically, the base station sends, in a downlink subframe, control information used to schedule the terminal to send the uplink information, and the terminal receives the control information, and sends the uplink information in a scheduled uplink subframe based on the control information. To implement friendly inter-system coexistence on the unlicensed spectrum, the terminal may perform LBT before sending the uplink information. For example, the terminal may perform single timeslot-based CCA or random backoff-based CCA based on the control information sent by the base station. Certainly, the terminal may alternatively skip performing LBT, and directly occupies the uplink subframe to send the uplink information.

An implementation process of performing the single timeslot-based CCA by the terminal is as follows: The terminal performs single timeslot-based CCA listening. For example, a timeslot length of the single timeslot is 25 μs, 34 μs, or 43 μs. If it is detected, by performing the single timeslot-based CCA, that a channel is idle, the terminal may immediately access the channel. Further, if it is detected, by performing the single timeslot-based CCA, that the channel is busy, the terminal may immediately enter a next CCA timeslot until the channel is idle. Alternatively, the terminal may abandon sending the information, and perform next single timeslot-based CCA listening before a next scheduled uplink subframe.

An implementation process of performing the random backoff-based CCA by the terminal is as follows: A wireless communications device evenly and randomly generates a backoff counter N between 0 and a contention window size (CWS), and performs listening by using an extended CCA (ECCA) timeslot as a granularity. Within the ECCA timeslot, if it is detected that a channel is idle, the backoff counter is reduced by 1; if it is detected that the channel is busy, the backoff counter is suspended, that is, the backoff counter N remains unchanged within a time during which the channel is busy, until it is detected that the channel is idle. When the backoff counter is reduced to 0, the terminal may immediately occupy the channel. The CWS may be dynamically adjusted within a set, and a typical value of the CWS is, for example, 3 or 7. A typical value of a random backoff-based CCA timeslot is, for example, 9 μs.

In the embodiments of the present invention, the terminal may determine, in the following manner, whether the channel is idle or busy: The terminal compares channel power received within a CCA timeslot or an ECCA timeslot with an energy detection threshold, and if the power is higher than the threshold, determines that the channel is busy, or if the power is lower than the threshold, determines that the channel is idle.

To reduce signaling overheads of sending the control information by the base station, the embodiments of the present invention provide a control information processing method. In the method, the base station sends jointly encoded control information after using a joint encoding manner to jointly encode different control information used to perform different scheduling on the terminal, so as to avoid a problem of control signaling overheads caused by separately sending the different control information, and reduce control signaling overheads.

It should be noted that in the embodiments of the present invention, the base station may be a macro base station (e.g. Macro eNB), a remote radio head (RRH), a micro base station (e.g. Pico eNB), a home base station (e.g. Home eNodeB (HeNB)), a relay node (RN), an access point (AP), or the like. The terminal may be a handheld device, an in-vehicle device, a wearable device, or a computing device that has a wireless communication function; another processing device connected to a wireless modem; or user equipment (UE), a mobile station (MS), a terminal device, or the like in various forms.

FIG. 1 is a flowchart of implementing a control information processing method according to an embodiment of the present invention. As shown in FIG. 1, the method includes the following steps.

S101. A base station determines jointly encoded control information obtained by jointly encoding first control information and second control information.

In this embodiment of the present invention, information content indicated by the first control information is different from information content indicated by the second control information. Therefore, jointly encoded control information obtained by jointly encoding different control information indicating different information content may be used to indicate that a terminal performs operation behaviors corresponding to more than one piece of message content.

In this embodiment of the present invention, the jointly encoded control information may be indicated by different indicator bits, and includes different indication states. The indicator bit may be a bit or a q-nary symbol bit, the indication state is an indicator bit having a state value, and different state values of the indicator bit correspondingly indicate different message content. For example, four state values "00", "01", "10", and "11" included in two bits may indicate four different pieces of message content.

It may be understood that in this embodiment of the present invention, the jointly encoded control information may be used to indicate that the terminal performs more than one operation behavior. Therefore, a terminal operation behavior indicated by an indication state of the jointly encoded control information may be one operation behavior, or may be a plurality of operation behaviors. In this embodiment of the present invention, the jointly encoded control information includes at least an indication state indicating a plurality of operation behaviors of the terminal. For example, terminal operation behaviors that may be indicated by different state values of an indicator bit including two bits may be as follows: '00' indicates that a starting time when UE starts to send a signal in an uplink subframe is 25 μs+, and the UE performs single timeslot-based CCA before the starting time for sending a signal; '01' indicates that a starting time when UE starts to send a signal in an uplink subframe is 1 symbol+ (that is, a signal is not sent on a first symbol of the uplink subframe, but starts to be sent on a second symbol), and the UE performs random backoff-based CCA; '10' indicates that a starting time when UE starts to send a signal in an uplink subframe is 0 μs+(that is, a signal starts to be sent at a starting time of the uplink subframe), and the UE performs single timeslot-based CCA before the starting time for sending a signal; '11' indicates that a starting time when UE starts to send a signal in an uplink subframe is 0 μs+(that is, a signal starts to be sent at a starting time of the uplink subframe), and the UE performs random backoff-based CCA before the starting time for sending a signal. In this case, each of the state values of the indicator bit '00', '01', '10', and '11' instructs the terminal to perform two operation behaviors. '00' or '10' indicates the starting time of the uplink subframe and the type of the CCA to-be-performed by the terminal: the single timeslot-based CCA; '01' or '11' indicates the starting time of the uplink subframe and the type of the CCA to-be-performed by the terminal: the random backoff-based CCA. Further, the jointly encoded control information includes an indication state indicating M operation behaviors of the terminal and an indication state indicating N operation behaviors of the terminal, and M is not equal to N. For example, terminal operation behaviors that may be indicated by different state values of an indicator bit including two bits may be as follows: '00' instructs the terminal to perform single timeslot-based CCA. In this case, '00' instructs the terminal to perform one operation behavior, that is, instructs the terminal to perform the single timeslot-based CCA. '01' instructs the terminal to perform random backoff-based, and a CWS is 3; and '10' instructs the terminal to perform random backoff-based CCA, and a CWS is 7. In this case, '01' or '10' instructs the terminal to perform two operation behaviors, that is, indicates the type of the CCA to-be-performed by the terminal: the random backoff-based CCA and the value of the CWS of the random backoff-based CCA to-be-performed by the terminal. Alternatively, for example, terminal operation behaviors that may be indicated by different state values of an indicator bit including three bits may be as follows: '000' indicates that a starting time when UE starts to send a signal in an uplink subframe is 25 μs+, and the UE performs single timeslot-based CCA before the starting time for sending a signal; '001' indicates that a starting time when UE starts to send a signal in an uplink subframe is 1 symbol+, the UE performs random backoff-based CCA, and a CWS is 3; '010' indicates that a starting time when UE starts to send a signal in an uplink subframe is 1 symbol+, the UE performs random backoff-based CCA, and a CWS is 7; '011' indicates that a starting time when UE starts to send a signal in an uplink subframe is 0 μs+, and the UE performs single timeslot-based CCA before the starting time for sending a signal; '100' indicates that a starting time when UE starts to send a signal in an uplink subframe is 0 μs+, the UE performs random backoff-based CCA, and a CWS is 3; '101' indicates that a starting time when UE starts to send a signal in an uplink subframe is 0 μs+, the UE performs random backoff-based CCA, and a CWS is 7. In this case, '000' or '011' instructs the terminal to perform two operation behaviors, that is, indicates the starting time of the uplink subframe and the type of the CCA to-be-performed by the terminal: the single timeslot-based CCA; '001', '010', '100', or '101' instructs the terminal to perform three operation behaviors, that is, indicates the starting time of the uplink subframe, the type of the CCA to-be-performed by the terminal: the random backoff-based CCA, and the value of the CWS of the random backoff-based CCA to-be-performed by the terminal.

S102. The base station sends the jointly encoded control information, and a terminal receives the jointly encoded control information sent by the base station.

In this embodiment of the present invention, the base station may send the jointly encoded control information to the terminal by using downlink control signaling in common search space or user-specific search space (also called terminal-specific search space) in a physical downlink control channel (PDCCH). If the base station sends the jointly encoded control information by using the common search space, the base station notifies all terminals of same jointly encoded control information, for example, a type of a CCA and a CWS/backoff counter initial value. If the base station sends the jointly encoded control information by using the user-specific search space, the base station notifies each terminal of respective jointly encoded control information.

Further, if the base station sends the jointly encoded control information by using the user-specific search space, the base station may send the jointly encoded control information to the terminal by using an uplink grant (UL grant) in the jointly encoded control information.

S103. The terminal performs an operation based on the jointly encoded control information.

In this embodiment of the present invention, the operation to-be-performed by the terminal may include one or more operations of determining a type of CCA to-be-performed by the terminal for the uplink subframe, determining a starting time when the terminal starts to send a signal in the uplink subframe, and determining a CWS or a backoff counter initial value of random backoff-based CCA. Then, the terminal may send, based on the jointly encoded control information, an uplink signal in an uplink service channel, an uplink control channel, or a channel corresponding to an uplink reference signal. That the terminal sends an uplink signal based on the jointly encoded control information includes: performing CCA based on the jointly encoded control information, and after the CCA is finished, occupying the uplink subframe to send a signal.

It should be noted that in this embodiment of the present invention, if LBT is performed, finishing the CCA includes that the LBT succeeds. That is, when the LBT succeeds, the terminal occupies the uplink subframe to send a signal. If LBT is not performed, finishing the CCA includes skipping performing the LBT. That is, the terminal may skip performing the LBT, and directly accesses the channel to send a signal.

It should be noted that in this embodiment of the present invention, the type of the CCA to-be-performed by the terminal for the uplink subframe includes: The terminal performs the LBT for channel listening before accessing an uplink channel, or the terminal skips performing the LBT before accessing an uplink channel. Performing the LBT includes performing single timeslot-based CCA or random backoff-based CCA.

It should further be noted that if the terminal performs the LBT for channel listening, the terminal needs to access the channel after the LBT succeeds, and if the terminal skips performing the LBT, the terminal may directly access the channel.

When the terminal performs uplink transmission, that the LBT succeeds means that the terminal finishes the LBT before sending a signal in the uplink subframe. Finishing the LBT includes: detecting, in a CCA timeslot based on the single timeslot-based CCA, that the channel is idle, and accessing a channel corresponding to the uplink subframe; or finishing CCA backoff based on the random backoff-based CCA, and accessing a channel corresponding to the uplink subframe.

In this embodiment of the present invention, the following describes a control information processing method in detail with reference to an actual application.

In this embodiment of the present invention, message content indicated by the first control information and message content indicated by the second control information may not overlap, but have an association relationship, and may be the type of the CCA and a listening parameter of the random backoff-based CCA including the contention window size CWS or the backoff counter initial value, or may be the starting time when the terminal starts to send a signal in the uplink subframe and a listening parameter of channel listening to-be-performed by the terminal in the uplink subframe. The listening parameter of the channel listening to-be-performed by the terminal in the uplink subframe includes the type of the clear channel assessment CCA to-be-performed by the terminal, or includes the type of the clear channel assessment CCA to-be-performed by the terminal and the listening parameter of the random backoff-based CCA to-be-performed by the terminal. The listening parameter of the random backoff-based CCA includes the contention window size CWS or the backoff counter initial value.

The following separately describes implementable joint encoding manners in this embodiment of the present invention.

In a first joint encoding manner, the type of the CCA and the listening parameter of the random backoff-based CCA are jointly encoded.

When the type of the CCA and the listening parameter of the random backoff-based CCA are jointly encoded by using the method for indicating the jointly encoded control information provided in this embodiment of the present invention, the first control information indicates the type of the clear channel assessment CCA to-be-performed by the terminal in the uplink subframe, and the second control information indicates the listening parameter of the random backoff-based CCA to-be-performed by the terminal. The listening parameter of the random backoff-based CCA includes the contention window size CWS or the backoff counter initial value.

The random backoff-based CCA requires listening parameter information such as the CWS or the backoff counter initial value, but the single timeslot-based CCA does not require the listening parameter information. Therefore, if two pieces of control signaling are used to respectively indicate the listening type and the listening parameter of the random backoff-based CCA, redundancy of matching between listening parameters of the single timeslot-based CCA and the random backoff-based CCA is generated. To resolve the problem, in this embodiment of the present invention, when the first control information and the second control information are jointly encoded, only a situation in which the information content indicated by the first control information matches the information content indicated by the second control information is retained, including at least one of the following situations: The first control information instructs the terminal to perform the single timeslot-based CCA in the uplink subframe, and the information content indicated by the second control information is null; and the first control information instructs the terminal to perform the random backoff-based CCA in the uplink subframe, and the second control information indicates the listening parameter of the random backoff-based CCA.

Further, the following situation is further included: The first control information instructs the terminal to skip performing LBT (No LBT), and occupies the uplink subframe to send a signal, and the information content indicated by the second control information is null.

In this embodiment of the present invention, the jointly encoded control information includes control information in which the content indicated by the first control information matches the content indicated by the second control information, and does not include information in which the content indicated by the first control information does not match the content indicated by the second control information. For example, the following situations are not included: The first control information indicates the single timeslot-based CCA, and the second control information indicates the listening parameter of the random backoff-based CCA. The first control information indicates no LBT, and the second control information indicates the listening parameter of the random backoff-based CCA.

In this embodiment of the present invention, the information content indicated by the first control information matches the information content indicated by the second control information, so that a situation in which the first control information indicates the single timeslot-based CCA, and the second control information indicates the listening parameter of the random backoff-based CCA, or a situation in which the first control information indicates no LBT, and the second control information indicates the listening parameter of the random backoff-based CCA can be avoided. In this embodiment of the present invention, a terminal behavior that cannot occur in a combination of at least two pieces of control information is removed from the jointly encoded control information, so as to avoid signaling redundancy caused by separately notifying the terminal of the at least two pieces of control information at the same time, and improve control information transmission efficiency.

In a specific implementation, when the type of the CCA and the CWS of the random backoff-based CCA are jointly encoded, an indication state of the jointly encoded control information may be a state set including at least two indication states of the following N+1 indication states. N is a quantity of elements in a value set of the CWS. For example, if a value of the CWS is 3 or 7, N is 2. A first indication state indicates that the single timeslot-based CCA is performed. A second indication state to an $(N+1)^{th}$ indication state are respectively used to indicate that the random backoff-based CCA is performed and the value of the CWS is a first value to an $N^{th}$ value. Further, the indication state of the jointly encoded control information may be a state set including at least two indication states of the following N+2 indication states. A first indication state indicates that the single timeslot-based CCA is performed. A second indication state to an $(N+1)^{th}$ indication state are respectively used to indicate that the random backoff-based CCA is performed and the value of the CWS is a first value to an $N^{th}$ value. An $(N+2)^{th}$ indication state indicates that the LBT is not performed (NO LBT), and the channel is directly accessed to send a signal.

In a specific implementation, when the type of the CCA and the backoff counter initial value of the random backoff-based CCA are jointly encoded, an indication state of the jointly encoded control information may be a state set including at least two indication states of the following M+1 indication states. M is a quantity of elements in a backoff counter initial value set. For example, if the backoff counter initial value is 0 to 7, M is 8. A first indication state indicates that the single timeslot-based CCA is performed. A second indication state to an $(M+1)^{th}$ indication state are respectively used to indicate that the random backoff-based CCA is performed and the backoff counter initial value is a first value to an $M^{th}$ value. Further, the indication state of the jointly encoded control information is a state set including at least two indication states of the following M+2 indication states. A first indication state indicates that the single timeslot-based CCA is performed. A second indication state to an $(M+1)^{th}$ indication state are respectively used to indicate that the random backoff-based CCA is performed and the backoff counter initial value is a first value to an $M^{th}$ value. An $(M+2)^{th}$ indication state indicates that the LBT is not performed (NO LBT), and the channel is directly accessed to send a signal.

This embodiment of the present invention is described by using an example in which the value of the CWS is 3 or 7, and the backoff counter initial value is 0 to 7. The indication state of the jointly encoded control information is shown in Table 1 and Table 2.

TABLE 1

| Indication State | Type of the CCA | CWS Value |
| --- | --- | --- |
| 1 | Single timeslot-based CCA | Not involved |
| 2 | Random backoff-based CCA | 3 |
| 3 | Random backoff-based CCA | 7 |
| 4 (optional) | No LBT | Not involved |

TABLE 2

| Indication State | Type of the CCA | Random Backoff Counter Initial Value |
| --- | --- | --- |
| 1 | Single timeslot-based CCA | Not involved |
| 2 to 9 | Random backoff-based CCA | 0 to 7 |
| 10 (optional) | No LBT | Not involved |

In this embodiment of the present invention, Table 1 and Table 2 list all situations, when the type of the CCA and the listening parameter of the random backoff-based CCA are jointly encoded, of operations that are to-be-performed by the terminal and that can be indicated by all indication states included in the jointly encoded control information. In a specific implementation, the jointly encoded control information may indicate one of the situations, and the terminal performs a corresponding operation based on the jointly encoded control information. The performing, by the terminal, clear channel assessment CCA based on the jointly encoded control information, and occupying, after finishing the CCA, the uplink subframe to send a signal includes: determining, by the terminal, the type of the CCA based on the jointly encoded control information, performing, by the terminal, the CCA based on the type of the CCA, and occupying, after finishing the CCA, the uplink subframe to send a signal; and further, if the type of the CCA is the random backoff-based CCA, further determining, by the terminal, the listening parameter of the random backoff-based CCA based on the jointly encoded control information, performing, by the terminal, the CCA based on the type of the CCA and the listening parameter of the random backoff-based CCA, and occupying, after finishing the CCA, the uplink subframe to send a signal.

In this embodiment of the present invention, an implementation in which the type of the CCA and the listening parameter of the random backoff-based CCA are jointly encoded is used, so as to reduce signaling overheads. For example, when a bit indicates message content of control information, a state value 1 indicates that the single timeslot-based CCA is performed, a state value 2 indicates that the random backoff-based CCA when the CWS is 3 is performed, and a state value 3 indicates that the random backoff-based CCA when the CWS is 7 is performed. Alternatively, a state value 1 indicates that no LBT is performed, a state value 2 indicates that the single timeslot-based CCA is performed, a state value 3 indicates that the random backoff-based CCA when the CWS is 3 is performed, and a state value 4 indicates that the random backoff-based CCA when the CWS is 7 is performed. Therefore, operation behaviors of the terminal can be completely indicated by using 2-bit control signaling in total. Compared with a case in which 2-bit control signaling indicates the listening type (No LBT/the single timeslot-based CCA/the random backoff-based CCA), and 1-bit control signaling indicates that the CWS is 3 or 7, 1-bit control signaling overheads are saved.

For another example, a state value 1 indicates that the single timeslot-based CCA is performed, and a state value 2 to a state value 9 are respectively used to indicate that the random backoff-based CCA is performed when the backoff counter initial value is 0 to 7. Alternatively, a state value 1 indicates that no LBT is performed, a state value 2 indicates that the single timeslot-based CCA is performed, a state value 3 to a state value 10 are respectively used to indicate that the random backoff-based CCA is performed when the backoff counter initial value is 0 to 7. Therefore, operation behaviors of the terminal can be completely indicated by using 4-bit control signaling in total. Compared with a case in which 2-bit control signaling indicates the listening type (No LBT/the single timeslot-based CCA/the random backoff-based CCA), and 2-bit control signaling indicates the operation behaviors of the terminal that are respectively indicated by the backoff counter initial values 0 to 7, 1-bit control signaling overheads are saved.

It should be noted that in this embodiment of the present invention, if a situation in which the message content indicated by the first control information does not match the message content indicated by the second control information is not excluded from the jointly encoded control information, the terminal may send a signal in a predefined manner after receiving the jointly encoded control information. For example, if the terminal is instructed by the base station to perform the single timeslot-based CCA and an operation behavior matching any CWS/backoff counter initial value of the random backoff-based CCA, the terminal always performs the single timeslot-based CCA, or performs the random backoff-based CCA based on an indicated CWS or backoff counter initial value. This may be predefined.

In a second joint encoding manner, the starting time for sending a signal in the uplink subframe and the type of the CCA to-be-performed by the terminal are jointly encoded.

When the starting time for sending a signal in the uplink subframe and the type of the clear channel assessment CCA to-be-performed by the terminal are jointly encoded by using the method for indicating the jointly encoded control information provided in this embodiment of the present invention, the first control information includes the starting time when the terminal starts to send a signal in the uplink subframe, and the second control information includes the type of the clear channel assessment CCA to-be-performed by the terminal.

Currently, an association relationship between the starting time of the uplink subframe and the type of the CCA is shown in Table 3:

TABLE 3

| Starting Time of the Uplink Subframe | Type of the CCA | Description |
|---|---|---|
| 0 μs+ | No LBT | The terminal continuously occupies the channel before the uplink subframe. |
|  | Single timeslot-based CCA | The terminal does not continuously occupy the channel before the uplink subframe, and the uplink subframe is within an MCOT. |
|  | Random backoff-based CCA | The terminal does not continuously occupy the channel before the uplink subframe, and the uplink subframe is beyond an MCOT. |
| 16 μs+/0 μs+/25 μs+/1 symbol+ | No LBT | Used to send a HARQ feedback. |
| 25 μs+/1 symbol+ | Single timeslot-based CCA | The uplink subframe is within an MCOT. |
| 1 symbol+ | Random backoff-based CCA | The uplink subframe is beyond an MCOT. |

According to the association relationship, shown in Table 3, between the starting time of the uplink subframe and the type of the CCA, if the base station separately notifies the terminal of the starting time of the uplink subframe (0 μs/16 μs/25 μs/1 symbol) or the type of the CCA (No LBT/the single timeslot-based CCA/the random backoff-based CCA), when the terminal does not successfully receive an indication of a starting time of a previous uplink subframe or a type of CCA for a previous uplink subframe, the terminal does not know whether the uplink subframe is within the MCOT or beyond the MCOT, and therefore cannot determine the type of the CCA. In addition, if the base station separately notifies the terminal of the starting time of the uplink subframe and the type of the CCA at the same time, redundancy of matching between 16 us and the single timeslot-based CCA/the random backoff-based CCA, matching between 25 us and no LBT/the random backoff-based CCA, and matching between 16 us and no LBT/the random backoff-based CCA is generated. To resolve the problem, in this embodiment of the present invention, when the first control information and the second control information are jointly encoded, only a situation in which the information content indicated by the first control information matches the information content indicated by the second control information is retained, including at least one of the following situations:

In a first situation, the first control information indicates that the starting time when the terminal starts to send a signal in the uplink subframe is after a starting time of the uplink subframe, and an interval between the starting time for sending a signal and the starting time of the uplink subframe is a first time; and the second control information instructs the terminal to perform single timeslot-based CCA before the starting time for sending a signal.

In a second situation, the first control information indicates that the starting time when the terminal starts to send a signal in the uplink subframe is after a starting time of the uplink subframe, and an interval between the starting time for sending a signal and the starting time of the uplink subframe is a second time; and the second control information instructs the terminal to perform random backoff-based CCA before the starting time for sending a signal.

In a third situation, the first control information indicates that the starting time when the terminal starts to send a signal in the uplink subframe is the same as a starting time of the uplink subframe, and the second control information instructs the terminal to perform single timeslot-based CCA before the starting time for sending a signal.

In a fourth situation, the first control information indicates that the starting time when the terminal starts to send a signal in the uplink subframe is the same as a starting time of the uplink subframe, and the second control information instructs the terminal to perform random backoff-based CCA before the starting time for sending a signal.

Further, the following fifth situation may be further included:

In the fifth situation, the first control information indicates that the starting time when the terminal starts to send a signal in the uplink subframe is after a starting time of the uplink subframe, and an interval between the starting time for sending a signal and the starting time of the uplink subframe is a third time; and the second control information instructs the terminal to skip performing LBT, and occupies the uplink subframe to send a signal.

It should be noted that, when the starting time for sending a signal in the uplink subframe and the type of the CCA to-be-performed by the terminal are jointly encoded, the jointly encoded control information does not include information about the CWS or the backoff counter initial value. Therefore, the CWS or the backoff counter initial value may be maintained on a base station side and notified to the terminal, or may be maintained on a terminal side.

It should further be noted that in the foregoing embodiment, the first time is an idle gap reserved for the terminal to perform the single timeslot-based CCA, for example, 25 μs or 1 symbol, and the second time is an idle gap reserved for the terminal to perform the random backoff-based CCA, for example, 1 symbol. The first time may be equal to the second time, or may not be equal to the second time.

It may be understood that the third time in the foregoing embodiment is a time period from the starting time of the uplink subframe to a time when the terminal skips performing the LBT, and directly occupies the uplink subframe to start to send the uplink signal. The third time is less than or equal to a maximum time interval during which the terminal does not perform the LBT, but directly accesses the channel. For example, a value interval of the third time is (0 µs, 16 µs]. Alternatively, the third time is equal to 0, that is, the base station adjusts the starting time of the uplink subframe, so that a time interval from a time when downlink transmission ends to the starting time of the uplink subframe is less than or equal to a maximum time interval during which the terminal skips performing the LBT, and directly starts to access the channel, that is, (0 µs, 16 µs]. Alternatively, the third time is equal to 25 µs or 1 symbol, that is, the base station adjusts the starting time of the uplink subframe, to meet a maximum time interval during which the terminal skips performing the LBT, and directly accesses the channel. It should be noted that the third time may be equal to 0, or may be greater than 0. The third time may be equal to the first time or the second time, or may not be equal to the first time or the second time.

In a specific implementation, when the starting time for sending a signal in the uplink subframe and the type of the CCA to-be-performed by the terminal are jointly encoded, the indication state of the jointly encoded control information may be a state set including at least two indication states in indication states shown in Table 4 and Table 5.

TABLE 4

| Indication State | Starting Time of the Uplink Subframe | Type of the CCA |
|---|---|---|
| 1 | 25 µs+/1 symbol+ | Single timeslot-based CCA |
| 2 | 1 symbol+ | Random backoff-based CCA |
| 3 | 0 µs+ | Single timeslot-based CCA |
| 4 | 0 µs+ | Random backoff-based CCA |

TABLE 5

| Indication State | Starting Time of the Uplink Subframe | Type of the CCA |
|---|---|---|
| 1 | 25 µs+/1 symbol+ | Single timeslot-based CCA |
| 2 | 1 symbol+ | Random backoff-based CCA |
| 3 | 0 µs+ | Single timeslot-based CCA |
| 4 | 0 µs+ | Random backoff-based CCA |
| 5 | 16 µs+/0 µs+/25 µs+/1 symbol+ | No LBT |

In Table 4 and Table 5, 0 µs+ indicates that the starting time for sending the uplink signal is equal to the starting time of the uplink subframe. 25 µs+ indicates that the starting time for sending the uplink signal is 25 µs after the starting time of the uplink subframe. 1 symbol+ indicates that the starting time for sending the uplink signal is one SC-FDMA symbol after the starting time of the uplink subframe. 25 µs+/1 symbol+ indicates that the starting time for sending the uplink signal is 25 is after the starting time of the uplink subframe when the single timeslot-based CCA is performed (different from the idle gap of the random backoff-based CCA), or the starting time for sending the uplink signal is one symbol after the starting time of the uplink subframe when the single timeslot-based CCA is performed (the same as the idle gap of the random backoff-based CCA). 16 µs+ indicates that the starting time for sending the uplink signal is 16 µs after the starting time of the uplink subframe.

In Table 4, 2-bit control signaling is required to completely indicate operation behaviors of the terminal. Compared with a case in which 2-bit control signaling indicates the starting time for sending the uplink signal (0 µs+/25 µs+/1 symbol+), and 1-bit control signaling indicates the type of the CCA (the single timeslot-based CCA/the random backoff-based CCA), 1-bit control signaling overheads are saved.

In Table 5, 3-bit control signaling is required to completely indicate operation behaviors of the terminal. Compared with a case in which 2-bit control signaling indicates the starting time for sending the uplink signal (0 µs/16 µs/25 µs/1 symbol), and 2-bit control signaling indicates the type of the CCA (No LBT/the single timeslot-based CCA/the random backoff-based CCA), 1-bit control signaling overheads are saved.

Figure 2:
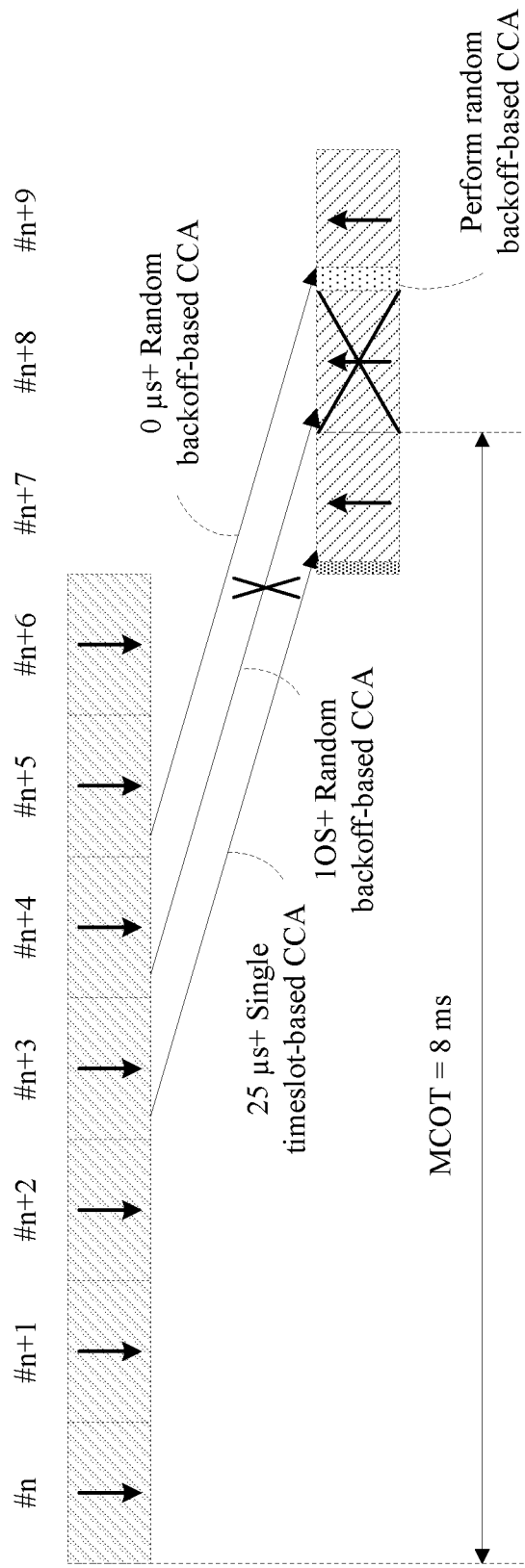
FIG. 2 is a schematic diagram of indicating jointly encoded control information by a base station according to an embodiment of the present invention.
Figure 3:
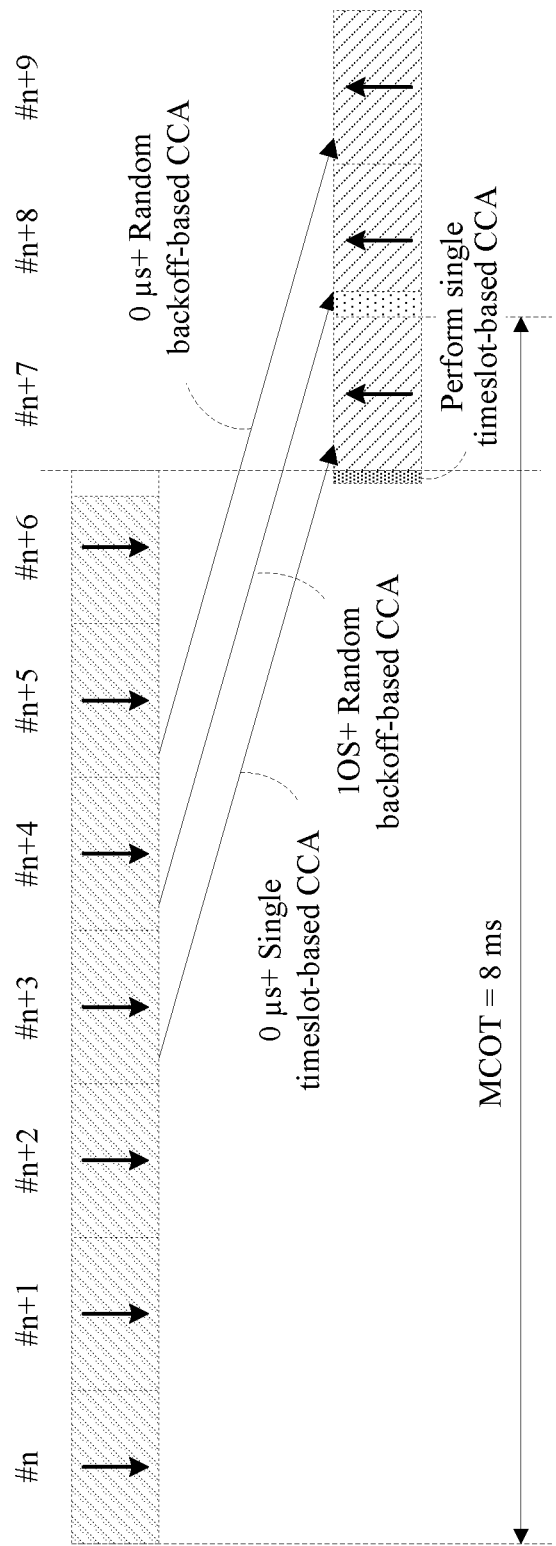
FIG. 3 is another schematic diagram of indicating jointly encoded control information by a base station according to an embodiment of the present invention.

In this embodiment of the present invention, the jointly encoded control information is sent, so that a problem that the type of the CCA to-be-performed by the terminal cannot be explicitly indicated in some scenarios when the starting time of the uplink subframe or the type of the CCA is separately notified can be resolved. For example, as shown in FIG. 2, although the terminal does not know a type of CCA for a subframe # n+8, the base station indicates an indication state 4 in Table 5 for a subframe # n+9, so that the terminal can perform the random backoff-based CCA. For another example, as shown in FIG. 3, the terminal learns that the base station indicates an indication state 3 in Table 5 for a subframe # n+7, so that the terminal can occupy the subframe # n+7 at a starting time of the subframe after successfully performing the single timeslot-based CCA.

In this embodiment of the present invention, the jointly encoded control information includes control information in which the content indicated by the first control information matches the content indicated by the second control information, and does not include information in which the content indicated by the first control information does not match the content indicated by the second control information. For example, the following situations are not included: The first control information indicates that the interval between the starting time when the terminal starts to send a signal in the uplink subframe and the starting time of the uplink subframe is the second time, and the second control information instructs the terminal to perform the single timeslot-based CCA before the starting time. The first control information indicates that the interval between the starting time when the terminal starts to send a signal in the uplink subframe and the starting time of the uplink subframe is the first time, and the second control information instructs the terminal to perform the random backoff-based CCA before the starting time. The first control information indicates that the interval between the starting time when the terminal starts to send a signal in the uplink subframe and the starting time of the uplink subframe is the third time, and the second control information instructs the terminal to perform the single timeslot-based CCA or the random backoff-based CCA before the starting time. The first control information indicates that the interval between the starting time when the terminal starts to send a signal in the uplink subframe and the starting time of the uplink subframe is the first time or the second time, or the starting time when the terminal starts to send a signal in the uplink subframe is the same as the starting time of the uplink subframe; and the second control information instructs the terminal to skip performing the LBT, but starts to send a signal at the starting time for sending a signal.

In this embodiment of the present invention, when the starting time for sending a signal in the uplink subframe and the type of the CCA to-be-performed by the terminal are jointly encoded, the information content indicated by the first control information matches the information content indicated by the second control information, so that matching between the single timeslot-based CCA and 1 symbol+, matching between the random backoff-based CCA and 25 µs+, matching between the single timeslot-based CCA/the random backoff-based CCA and 16 µs+, and matching between no LBT and 1 symbol/25 µs/0 µs can be avoided. In this embodiment of the present invention, a terminal behavior that cannot occur in a combination of at least two pieces of control information is removed from the jointly encoded control information, so as to avoid signaling redundancy caused by separately notifying the terminal of the at least two pieces of control information at the same time, and improve control information transmission efficiency.

Further, in this embodiment of the present invention, if a situation in which the message content indicated by the first control information does not match the message content indicated by the second control information is not excluded from the jointly encoded control information, the terminal may send a signal in a predefined manner after receiving the jointly encoded control information. For example, if the jointly encoded control information received by the terminal indicates that an operation behavior for the matching between the single timeslot-based CCA and 1 symbol+ is to be performed, the terminal may always perform an operation behavior for matching between the single timeslot-based CCA and 25 µs+, or perform an operation behavior for matching between the random backoff-based CCA and 1 symbol+. If the jointly encoded control information received by the terminal indicates that an operation behavior for the matching between the random backoff-based CCA and 25 µs+ is to be performed, the terminal may always perform an operation behavior for matching between the single timeslot-based CCA and 25 µs+, or perform an operation behavior for matching between the random backoff-based CCA and 1 symbol+. If the jointly encoded control information received by the terminal indicates that an operation behavior for the matching between the single timeslot-based CCA/the random backoff-based CCA and 16 µs+ is to be performed, the terminal may always perform an operation behavior for matching between the single timeslot-based CCA and 25 µs+, perform an operation behavior for matching between the random backoff-based CCA and 1 symbol+, or perform an operation behavior for matching between no LBT and 16 µs+. If the jointly encoded control information received by the terminal indicates that an operation behavior for the matching between no LBT and 1 symbol/25 µs/0 µs is to be performed, the terminal may always perform an operation behavior for matching between the single timeslot-based CCA and 25 µs+, perform an operation behavior for matching between the random backoff-based CCA and 1 symbol+, or perform an operation behavior for matching between no LBT and 16 µs+.

In this embodiment of the present invention, Table 4 and Table 5 list all situations, when the starting time for sending a signal in the uplink subframe and the type of the CCA to-be-performed by the terminal are jointly encoded, of operations that are to-be-performed by the terminal and that can be indicated by all indication states included in the jointly encoded control information. In a specific implementation, the jointly encoded control information may indicate one of the situations, and the terminal performs a corresponding operation based on a situation indicated by the jointly encoded control information. The performing, by the terminal, clear channel assessment CCA based on the jointly encoded control information, and occupying, after finishing the CCA, the uplink subframe to send a signal at the starting time for sending a signal in the uplink subframe includes: determining, by the terminal based on the jointly encoded control information, the type of the CCA and the starting time for sending a signal in the uplink subframe; performing, by the terminal, the CCA based on the type of the CCA; and occupying, after finishing the CCA, the uplink subframe to send a signal at the starting time for sending a signal in the uplink subframe.

It should be noted that, if an operation behavior indicated by the jointly encoded control information received by the terminal is that the starting time when the terminal starts to send a signal in the uplink subframe is equal to the starting time of the uplink subframe and the terminal performs the single timeslot-based CCA, or the starting time when the terminal starts to send a signal in the uplink subframe is equal to the starting time of the uplink subframe and the terminal performs the random backoff-based CCA, if the terminal continuously occupies the channel before the uplink subframe until the starting time of the uplink subframe (that is, the terminal successfully accesses the channel in a previous uplink subframe of the uplink subframe), the terminal may not need to perform the LBT, but continue to occupy the channel to send a signal in the uplink subframe; or if the terminal does not continuously occupy the channel until the starting time of the uplink subframe (a listening gap is reserved on a tail of a previous subframe, or a type of CCA for a previous subframe is missing), the terminal performs the LBT based on the type of the CCA that is included in the jointly encoded control information, and may access the uplink subframe after the LBT succeeds.

Figure 4:
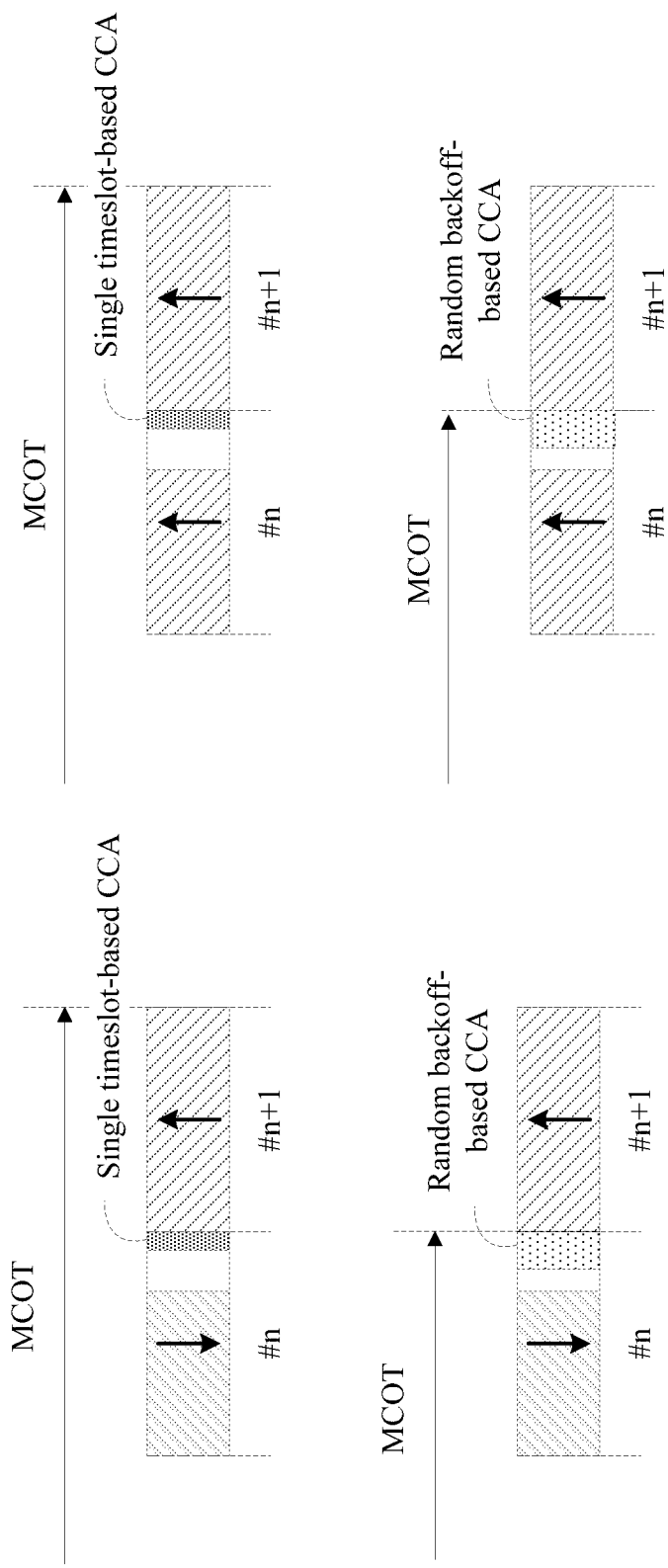
FIG. 4 is a schematic diagram that a listening gap is reserved in a previous subframe according to an embodiment of the present invention.

A situation in which the listening gap is reserved on the tail of the previous subframe is as follows: The previous subframe of the uplink subframe is a downlink subframe or an uplink subframe. However, the base station does not occupy all symbols of the previous downlink subframe, and retains at least a last symbol to serve as an idle gap. Alternatively, the terminal does not occupy all symbols of the previous uplink subframe, and retains at least a last symbol to serve as an idle gap. In the two cases, the terminal may perform the single timeslot-based CCA or the random backoff-based CCA within a time period corresponding to a last idle symbol of the previous subframe. If the LBT succeeds, the terminal occupies a first symbol of the uplink subframe, and does not need to reserve an idle gap. This is shown in FIG. 4.

Figure 5:
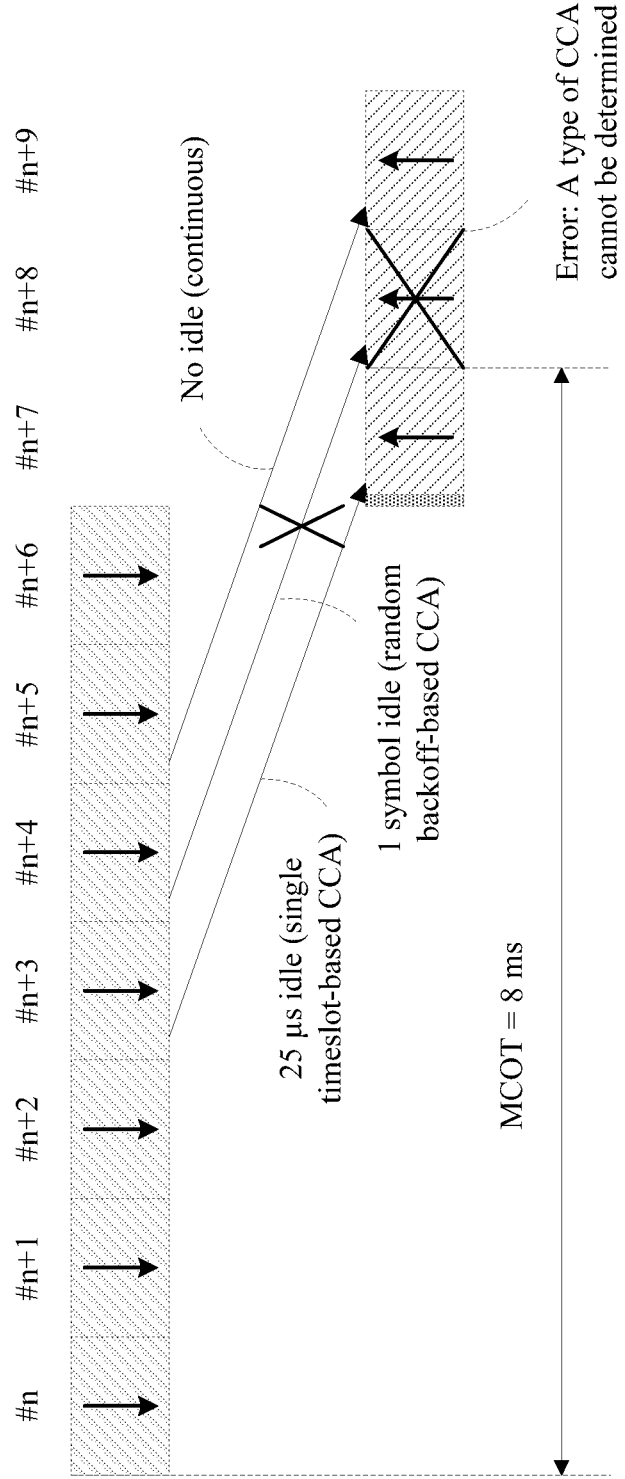
FIG. 5 is a schematic diagram that a type of LBT for a previous subframe is missing according to an embodiment of the present invention.

A situation in which a type of the LBT for the previous subframe is missing is as follows: The base station schedules the terminal to occupy an uplink subframe before the uplink subframe and continuously occupy the channel until an ending time of the uplink subframe. Therefore, the LBT does not need to be performed. However, because the terminal does not receive a UL grant of the uplink subframe before the uplink subframe scheduled by the base station, the terminal cannot occupy the uplink subframe before the uplink subframe, and therefore needs to perform the LBT in the uplink subframe to access the channel. Because the base station instructs the terminal to occupy a first symbol of the uplink subframe, the terminal can perform the LBT only before the uplink subframe. This is shown in FIG. 5.

In a third joint encoding manner, the starting time for sending a signal in the uplink subframe, the type of the CCA, and the listening parameter of the random backoff-based CCA are jointly encoded.

In this embodiment of the present invention, if the listening parameter of the random backoff-based CCA is maintained on the base station side and notified to the terminal, the listening parameter of the random backoff-based CCA may also be jointly encoded and added to the control information, so as to further reduce control signaling overheads.

In this embodiment of the present invention, when the starting time for sending a signal in the uplink subframe, the type of the CCA, and the listening parameter of the random backoff-based CCA are jointly encoded by using the method for indicating the jointly encoded control information provided in this embodiment of the present invention, the first control information includes the starting time when the terminal starts to send a signal in the uplink subframe, and the second control information includes the type of the clear channel assessment CCA to-be-performed by the terminal and the listening parameter of the random backoff-based CCA to-be-performed by the terminal. The listening parameter of the random backoff-based CCA includes the contention window size CWS or the backoff counter initial value.

In this embodiment of the present invention, to avoid information redundancy caused by mismatching between the information content indicated by the first control information and the information content indicated by the second control information, only a situation in which the information content indicated by the first control information matches the information content indicated by the second control information may be retained, including at least one of the following situations:

In a first situation, the first control information indicates that the starting time when the terminal starts to send a signal in the uplink subframe is after a starting time of the uplink subframe, and an interval between the starting time for sending a signal and the starting time of the uplink subframe is a fourth time; and the second control information instructs the terminal to perform single timeslot-based CCA before the starting time for sending a signal.

In a second situation, the first control information indicates that the starting time when the terminal starts to send a signal in the uplink subframe is after a starting time of the uplink subframe, and an interval between the starting time for sending a signal and the starting time of the uplink subframe is a fifth time; and the second control information instructs the terminal to perform the random backoff-based CCA before the starting time for sending a signal, and indicates the listening parameter of the random backoff-based CCA.

In a third situation, the first control information indicates that the starting time when the terminal starts to send a signal in the uplink subframe is the same as a starting time of the uplink subframe, and the second control information instructs the terminal to perform single timeslot-based CCA before the starting time for sending a signal.

In a fourth situation, the first control information indicates that the starting time when the terminal starts to send a signal in the uplink subframe is the same as a starting time of the uplink subframe, and the second control information instructs the terminal to perform the random backoff-based CCA before the starting time for sending a signal, and indicates the listening parameter of the random backoff-based CCA.

Further, the following situation may be further included:

In a fifth situation, the first control information indicates that the starting time when the terminal starts to send a signal in the uplink subframe is after a starting time of the uplink subframe, and an interval between the starting time for sending a signal and the starting time of the uplink subframe is a sixth time; and the second control information instructs the terminal to skip performing listen before talk LBT, and occupies the uplink subframe to send a signal, and message content of the listening parameter of the random backoff-based CCA is null.

It should be noted that in this embodiment of the present invention, the fourth time and the first time may be the same, or may be different; the fifth time and the second time may be the same, or may be different; and the sixth time and the third time may be the same, or may be different. For a relationship among the fourth time, the fifth time, and the sixth time, refer to the relationship among the first time, the second time, and the third time.

In a specific implementation, when the starting time for sending a signal in the uplink subframe, the type of the CCA, and the CWS of the random backoff-based CCA are jointly encoded, an indication state of the jointly encoded control information may be a state set including at least two indication states of the following $2*N+2$ indication states. N is a quantity of elements in a value set of the CWS. For example, if a value of the CWS is 3 or 7, N is 2. A first indication state indicates that the starting time for sending a signal in the uplink subframe is after the starting time of the uplink subframe, the interval between the starting time for sending a signal in the uplink subframe and the starting time of the uplink subframe is the fourth time, and the single timeslot-based CCA is performed. A second indication state indicates that the starting time when the UE starts to send a signal in the uplink subframe is equal to the starting time of the uplink subframe, and the single timeslot-based CCA is performed. A third indication state to an $(N+2)^{th}$ indication state are respectively used to indicate that the starting time when the UE starts to send a signal in the uplink subframe is after the starting time of the uplink subframe, the interval between the starting time when the UE starts to send a signal in the uplink subframe and the starting time of the uplink subframe is the fifth time, the random backoff-based CCA is performed, and the value of the CWS is a first value to an $N^{th}$ value. An $(N+3)^{th}$ indication state to a $(2*N+2)^{th}$ indication state are respectively used to indicate that the starting time when the UE starts to send a signal in the uplink subframe is equal to the starting time of the uplink subframe, the random backoff-based CCA is performed, and the value of the CWS is a first value to an $N^{th}$ value.

Further, in addition to the foregoing $(2*N+2)$ indication states, the indication state of the jointly encoded control information may further include a $(2*N+3)^{th}$ indication state. The $(2*N+3)^{th}$ indication state indicates that the starting time when the UE starts to send a signal in the uplink subframe is after the starting time of the uplink subframe, the interval between the starting time when the UE starts to send a signal in the uplink subframe and the starting time of the uplink subframe is the sixth time, and the LBT does not need to be performed, but the channel is directly accessed.

In a specific implementation, when the starting time for sending a signal in the uplink subframe, the type of the CCA, and the backoff counter initial value of the random backoff-based CCA are jointly encoded, an indication state of the jointly encoded control information may be a state set including at least two indication states of the following $2*M+2$ indication states. M is a quantity of elements in a backoff counter initial value set. For example, if the backoff counter initial value is 0 to 7, M is 8. A first indication state indicates that the starting time for sending a signal in the uplink subframe is after the starting time of the uplink subframe, the interval between the starting time for sending a signal in the uplink subframe and the starting time of the uplink subframe is the fourth time, and the single timeslot-based CCA is performed. A second indication state indicates that the starting time when the UE starts to send a signal in the uplink subframe is equal to the starting time of the uplink subframe, and the single timeslot-based CCA is performed. A third indication state to an $(M+2)^{th}$ indication state are respectively used to indicate that the starting time when the UE starts to send a signal in the uplink subframe is after the starting time of the uplink subframe, the interval between the starting time when the UE starts to send a signal in the uplink subframe and the starting time of the uplink subframe is the fifth time, the random backoff-based CCA is performed, and the backoff counter initial value is a first value to an $M^{th}$ value. An $(M+3)^{th}$ indication state to a $(2*M+2)^{th}$ indication state are respectively used to indicate that the starting time when the UE starts to send a signal in the uplink subframe is equal to the starting time of the uplink subframe, the random backoff-based CCA is performed, and the backoff counter initial value is a first value to an $M^{th}$ value.

Further, in addition to the foregoing $(2*M+2)$ indication states, the indication state of the jointly encoded control information may further include a $(2*M+3)^{th}$ indication state. The $(2*M+3)^{th}$ indication state indicates that the starting time when the UE starts to send a signal in the uplink subframe is after the starting time of the uplink subframe, the interval between the starting time when the UE starts to send a signal in the uplink subframe and the starting time of the uplink subframe is the sixth time, and the LBT does not need to be performed, but the channel is directly accessed.

This embodiment of the present invention is described by using an example in which the value of the CWS is 3 or 7, and the backoff counter initial value is 0 to 7. The indication state of the jointly encoded control information is shown in Table 6 to Table 9.

TABLE 6

| Indication State | Starting Time of the Uplink Subframe | Type of the CCA | CWS Value |
|---|---|---|---|
| 1 | 25 μs+/1 symbol+ | Single timeslot-based CCA | Not involved |
| 2 | 0 μs+ | Single timeslot-based CCA | Not involved |
| 3 | 1 symbol+ | Random backoff-based CCA | 3 |
| 4 | 1 symbol+ | Random backoff-based CCA | 7 |
| 5 | 0 μs+ | Random backoff-based CCA | 3 |
| 6 | 0 μs+ | Random backoff-based CCA | 7 |

In Table 6, an example in which the value of the CWS is 3 or 7 is used, and 2-bit control signaling is required to completely indicate operation behaviors of the terminal. Compared with a case in which 2-bit control signaling indicates the starting time for sending the uplink signal (0 μs+/25 μs+/1 symbol+), 1-bit control signaling indicates the type of the CCA (the single timeslot-based CCA/the random backoff-based CCA), and 1-bit control signaling indicates the value of the CWS (3/7), 2-bit control signaling overheads are saved.

TABLE 7

| Indication State | Starting Time of the Uplink Subframe | Type of the CCA | CWS Value |
|---|---|---|---|
| 1 | 25 μs+/1 symbol+ | Single timeslot-based CCA | Not involved |

TABLE 7-continued

| Indication State | Starting Time of the Uplink Subframe | Type of the CCA | CWS Value |
|---|---|---|---|
| 2 | 0 μs+ | Single timeslot-based CCA | Not involved |
| 3 | 1 symbol+ | Random backoff-based CCA | 3 |
| 4 | 1 symbol+ | Random backoff-based CCA | 7 |
| 5 | 0 μs+ | Random backoff-based CCA | 3 |
| 6 | 0 μs+ | Random backoff-based CCA | 7 |
| 7 | 16 μs+/0 μs+/25 μs+/1 symbol+ | No LBT | Not involved |

In Table 7, 3-bit control signaling is required to completely indicate operation behaviors of the terminal. Compared with a case in which 2-bit control signaling indicates the starting time for sending the uplink signal (0 μs/16 μs/25 μs/1 symbol), 2-bit control signaling indicates the type of the CCA (No LBT/the single timeslot-based CCA/the random backoff-based CCA), and 1-bit control signaling indicates the value of the CWS (3/7), 2-bit control signaling overheads are saved.

If a possible time gap value is considered to be only 0 μs/1 symbol, 0 μs corresponds to no LBT, and 1 symbol corresponds to the single timeslot-based CCA and the random backoff-based CCA, compared with a case in which 1-bit control signaling indicates the starting time for sending the uplink signal (0 μs/1 symbol), 2-bit control signaling indicates the type of the CCA (No LBT/the single timeslot-based CCA/the random backoff-based CCA), and 1-bit control signaling indicates the value of the CWS (3/7), 1-bit overheads are saved.

TABLE 8

| Indication State | Starting Time of the Uplink Subframe | Type of the CCA | Backoff Counter Initial Value |
|---|---|---|---|
| 1 | 25 μs+/1 symbol+ | Single timeslot-based CCA | Not involved |
| 2 to 9 | 1 symbol+ | Random backoff-based CCA | 0 to 7 |
| 10 | 0 μs+ | Single timeslot-based CCA | Not involved |
| 11 to 18 | 0 μs+ | Random backoff-based CCA | 0 to 7 |

In Table 8, an example in which the backoff counter initial value is 0 to 7 is used, and 5-bit control signaling is required to completely indicate operation behaviors of the terminal. Compared with a case in which 2-bit control signaling indicates the starting time for sending the uplink signal (0 μs+/25 μs+/1 symbol+), 1-bit control signaling indicates the type of the CCA (the single timeslot-based CCA/the random backoff-based CCA), and 3-bit control signaling indicates the backoff counter initial value (0 to 7), 1-bit overheads are saved.

TABLE 9

| Indication State | Starting Time of the Uplink Subframe | Type of the CCA | Backoff Counter Initial Value |
|---|---|---|---|
| 1 | 25 μs+/1 symbol+ | Single timeslot-based CCA | Not involved |
| 2 to 9 | 1 symbol+ | Random backoff-based CCA | 0 to 7 |
| 10 | 0 μs+ | Single timeslot-based CCA | Not involved |

TABLE 9-continued

| Indication State | Starting Time of the Uplink Subframe | Type of the CCA | Backoff Counter Initial Value |
|---|---|---|---|
| 11 to 18 | 0 μs+ | Random backoff-based CCA | 0 to 7 |
| 19 | 16 μs+/0 μs+/25 μs+/1 symbol+ | No LBT | Not involved |

In Table 9, 5-bit control signaling is required to completely indicate operation behaviors of the terminal. Compared with a case in which 2-bit control signaling indicates the starting time for sending the uplink signal (0 μs/16 μs/25 μs/1 symbol), 2-bit control signaling indicates the type of the CCA (No LBT/the single timeslot-based CCA/the random backoff-based CCA), and 3-bit control signaling indicates the backoff counter initial value (0 to 7), 2-bit overheads are saved.

If a possible time gap value is considered to be only 0 μs/1 symbol, 0 μs corresponds to no LBT, and 1 symbol corresponds to the single timeslot-based CCA and the random backoff-based CCA, compared with a case in which 1-bit control signaling indicates the starting time for sending the uplink signal (0 μs/1 symbol), 2-bit control signaling indicates the type of the CCA (No LBT/the single timeslot-based CCA/the random backoff-based CCA), and 3-bit control signaling indicates the backoff counter initial value (0 to 7), 1-bit overheads are saved.

Further, the jointly encoded control information includes control information in which the content indicated by the first control information matches the content indicated by the second control information, and does not include information in which the content indicated by the first control information does not match the content indicated by the second control information. For example, the following situations are not included: The second control information instructs the terminal to perform the single timeslot-based CCA before the starting time, and indicates the CWS or the backoff counter initial value of the random backoff-based CCA. The first control information indicates that the interval between the starting time when the terminal starts to send a signal in the uplink subframe and the starting time of the uplink subframe is the fifth time, and the second control information instructs the terminal to perform the single timeslot-based CCA before the starting time. The first control information indicates that the interval between the starting time when the terminal starts to send a signal in the uplink subframe and the starting time of the uplink subframe is the fourth time, and the second control information instructs the terminal to perform the random backoff-based CCA before the starting time, and indicate the CWS or the backoff counter initial value. The first control information indicates that the interval between the starting time when the terminal starts to send a signal in the uplink subframe and the starting time of the uplink subframe is the sixth time, and the second control information instructs the terminal to perform the single timeslot-based CCA before the starting time, or the second control information indicates the random backoff-based CCA and the CWS or the backoff counter initial value. The first control information indicates that the interval between the starting time when the terminal starts to send a signal in the uplink subframe and the starting time of the uplink subframe is the fourth time or the fifth time, or the starting time when the terminal starts to send a signal in the uplink subframe is the same as the starting time of the uplink subframe; and the second control information instructs the terminal to skip performing the LBT, but starts to send a signal at the starting time for sending a signal.

In this embodiment of the present invention, when the starting time for sending a signal in the uplink subframe, the type of the CCA, and the listening parameter of the random backoff-based CCA are jointly encoded, the information content indicated by the first control information matches the information content indicated by the second control information, so that matching between the single timeslot-based CCA and any CWS/backoff counter initial value of the random backoff-based CCA, matching between the single timeslot-based CCA and 1 symbol+, matching between the random backoff-based CCA and 25 μs+, matching between the single timeslot-based CCA/the random backoff-based CCA and 16 μs+, and matching between no LBT and 1 symbol+/25 μs+/0 μs+ can be avoided. In this embodiment of the present invention, a terminal behavior that cannot occur in a combination of at least two pieces of control information is removed from the jointly encoded control information, so as to avoid signaling redundancy caused by separately notifying the terminal of the at least two pieces of control information at the same time, and improve control information transmission efficiency.

It should be noted that in this embodiment of the present invention, if a situation in which the message content indicated by the first control information does not match the message content indicated by the second control information is not excluded from the jointly encoded control information, the terminal may send a signal in a predefined manner after receiving the jointly encoded control information. For a specific execution manner, refer to the foregoing embodiment. Details are not described herein again.

It should be noted that in this embodiment of the present invention, Table 6 to Table 9 list all situations, when the starting time for sending a signal in the uplink subframe, the type of the CCA, and the listening parameter of the random backoff-based CCA are jointly encoded, of operations that are to-be-performed by the terminal and that can be indicated by all indication states included in the jointly encoded control information. In a specific implementation, the jointly encoded control information may indicate one of the situations, and the terminal performs a corresponding operation based on a situation indicated by the jointly encoded control information. The performing, by the terminal, clear channel assessment CCA based on the jointly encoded control information, and occupying, after finishing the CCA, the uplink subframe to send a signal at the starting time for sending a signal in the uplink subframe includes: determining, by the terminal based on the jointly encoded control information, the type of the CCA and the starting time for sending a signal in the uplink subframe, performing, by the terminal, the CCA based on the type of the CCA, and occupying, after finishing the CCA, the uplink subframe to send a signal at the starting time for sending a signal in the uplink subframe; and further, if the type of the CCA is the random backoff-based CCA, further determining, by the terminal, the listening parameter of the random backoff-based CCA based on the jointly encoded control information, performing, by the terminal, the CCA based on the type of the CCA and the listening parameter of the random backoff-based CCA, and occupying, after finishing the CCA, the uplink subframe to send a signal.

It should be noted that, if the indication state of the jointly encoded control information received by the terminal is that the first control information indicates that the starting time when the terminal starts to send a signal in the uplink subframe is after the starting time of the uplink subframe, and the interval between the starting time for sending a signal and the starting time of the uplink subframe is the fifth time, and the second control information instructs the terminal to perform the random backoff-based CCA before the starting time for sending a signal, and indicates the listening parameter of the random backoff-based CCA, or the first control information indicates that the starting time when the terminal starts to send a signal in the uplink subframe is the same as the starting time of the uplink subframe, and the second control information instructs the terminal to perform the random backoff-based CCA before the starting time for sending a signal, and indicates the listening parameter of the random backoff-based CCA, if the terminal continuously occupies the channel before the uplink subframe until the starting time of the uplink subframe (that is, the terminal successfully accesses the channel in a previous uplink subframe of the uplink subframe), the terminal may not need to perform the LBT, but continue to occupy the channel to send a signal in the uplink subframe; or if the terminal does not continuously occupy the channel until the starting time of the uplink subframe (a listening gap is reserved on a tail of a previous subframe, or a type of CCA for a previous subframe is missing), the terminal performs the LBT based on the type of the CCA that is included in the jointly encoded control information, and may access the uplink subframe after the LBT succeeds.

It should be noted that the terms "first", "second", and the like in the specification, claims, and accompanying drawings of the embodiments of the present invention are intended to distinguish between similar objects, but do not necessarily indicate a specific order or sequence. For example, the first control information and the second control information in the embodiments of the present invention are for distinguishing between different control information for ease of description, and do not constitute a limitation on control information. It should be understood that the data used in such a way are interchangeable in proper circumstances, so that the embodiments of the present invention described herein can be implemented in other orders than the order illustrated or described herein.

Figure 6:
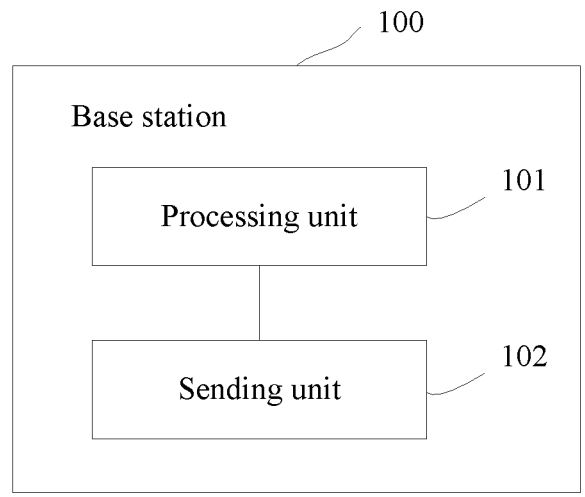
FIG. 6 is a schematic structural diagram of a base station according to an embodiment of the present invention.

Based on the control information processing method provided in the foregoing embodiment, an embodiment of the present invention further provides a base station. FIG. 6 is a schematic structural diagram of a base station according to an embodiment of the present invention. In FIG. 6, a base station 100 includes a processing unit 101 and a sending unit 102.

The processing unit 101 is configured to determine jointly encoded control information for an uplink subframe, where the jointly encoded control information is control information obtained by jointly encoding first control information and second control information.

The sending unit 102 is configured to send the jointly encoded control information determined by the processing unit.

Figure 7:
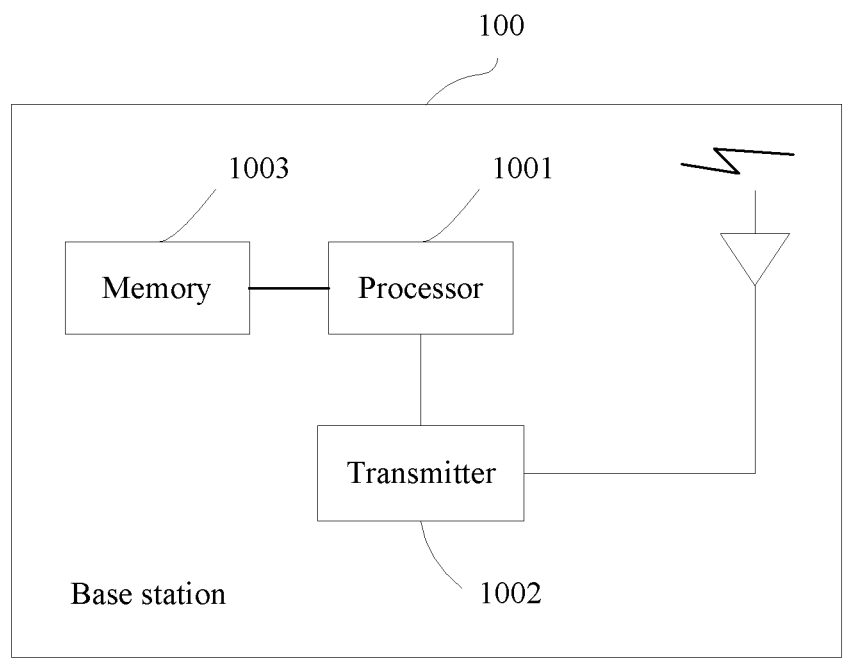
FIG. 7 is another schematic structural diagram of a base station according to an embodiment of the present invention.

FIG. 7 is another schematic structural diagram of a base station according to an embodiment of the present invention. In FIG. 7, a base station 100 includes a processor 1001 and a transmitter 1002. The processor 1001 is configured to determine jointly encoded control information for an uplink subframe. The transmitter 1002 is configured to have the capability to send the jointly encoded control information, to support communication with a terminal. The base station 100 may further include a memory 1003, where the memory 1003 is configured to couple to the processor and store a program instruction and data that are necessary for the base station 100.

It should be noted that the base station 100 in this embodiment of the present invention may be configured to implement all functions of the base station in the foregoing method embodiment. For a specific implementation process, refer to related descriptions of the foregoing method embodiment. Details are not described herein again.

Figure 8:
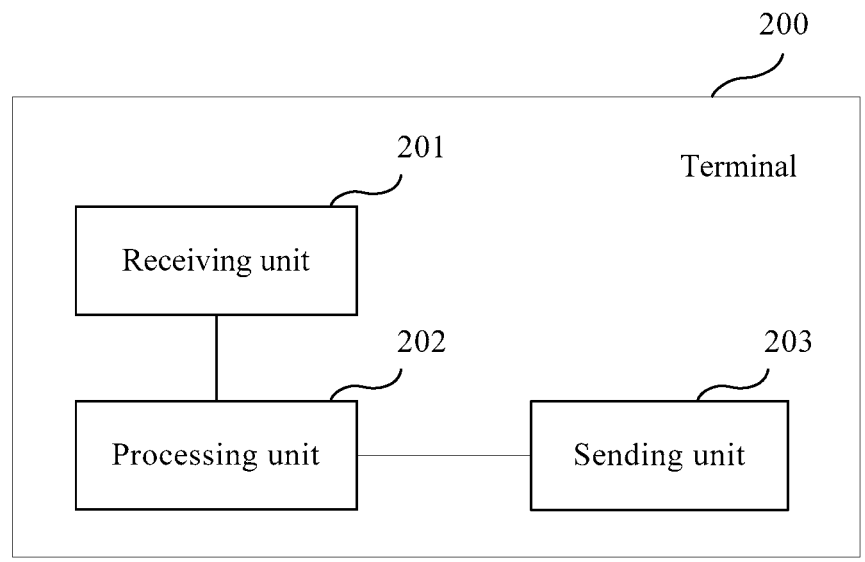
FIG. 8 is a schematic structural diagram of a terminal according to an embodiment of the present invention.

Based on the control information processing method provided in the foregoing embodiment, an embodiment of the present invention further provides a terminal. FIG. 8 is a schematic structural diagram of a terminal according to an embodiment of the present invention. In FIG. 8, a terminal 200 includes a receiving unit 201, a processing unit 202, and a sending unit 203.

The receiving unit 201 is configured to receive jointly encoded control information sent by a base station, where the jointly encoded control information is for an uplink subframe, and is control information obtained by jointly encoding first control information and second control information. The processing unit 202 is configured to perform clear channel assessment CCA based on the jointly encoded control information received by the receiving unit 201. The sending unit 203 is configured to occupy, after the processing unit 202 finishes the CCA, the uplink subframe to send a signal.

Figure 9:
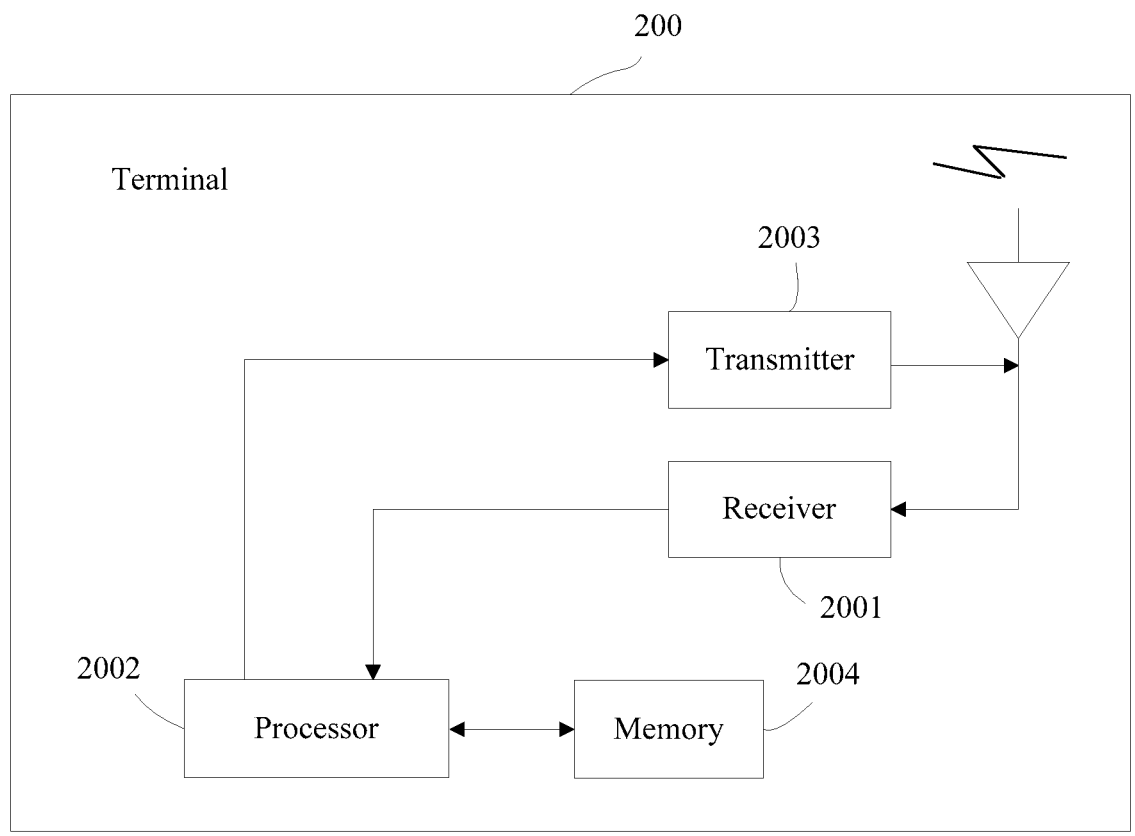
FIG. 9 is another schematic structural diagram of a terminal according to an embodiment of the present invention.

FIG. 9 is another schematic structural diagram of a terminal 200 according to an embodiment of the present invention. As shown in FIG. 9, the terminal 200 includes a receiver 2001, a processor 2002, and a transmitter 2003. The processor 2002 is configured to support the terminal in implementing corresponding functions in the foregoing method. The receiver 2001 is configured to have the capability to receive jointly encoded control information sent by a base station. The transmitter 2003 is configured to have the capability to send a signal. The terminal 200 may further include a memory 2004, where the memory 2004 is configured to couple to the processor 2002 and store a program instruction and data that are necessary for the terminal.

It should be noted that the terminal 200 in this embodiment of the present invention may be configured to implement all functions of the terminal in the foregoing method embodiment. For a specific implementation process, refer to related descriptions of the foregoing method embodiment. Details are not described herein again.

It should further be noted that the processor in this embodiment of the present invention may be a general-purpose central processing unit (CPU), a microprocessor, an application-specific integrated circuit (ASIC), or one or more integrated circuits for controlling program execution of the solution of embodiments of the present invention. One or more memories included in a computer system may be: a read-only memory (ROM) or an another-type static storage device that can store static information and instructions; or a random access memory (RAM) or an another-type dynamic storage device that can store information and instructions; or a magnetic disk storage. These memories are connected to the processor by using a bus.

The receiver and the transmitter may be an apparatus of a transceiver type, so as to communicate with another device or communications network, for example, an Ethernet, a radio access network (RAN), or a wireless local area network (WLAN).

The memory, for example, a RAM, stores an operating system and a program used to execute the solution of embodiments of the present invention. The operating system is a program used to control running of another program and manage a system resource.

A person of ordinary skill in the art may understand that all or some of the steps in each of the foregoing method of the embodiments may be implemented by a program instructing a processor. The foregoing program may be stored in a computer readable storage medium. The storage medium may be a non-transitory (non-transitory) medium, such as a random-access memory, a read-only memory, a flash memory, a hard disk, a solid state drive, a magnetic tape (magnetic tape), a floppy disk (floppy disk), an optical disc (optical disc), or any combination thereof.

Embodiments of the present invention are described with reference to flowcharts and/or block diagrams. It should be understood that computer program instructions may be used to implement each process and each block in the flowcharts and the block diagrams and a combination of a process and a block in the flowcharts and the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more procedures in the flowcharts or in one or more blocks in the block diagrams.

The foregoing descriptions are merely example implementations of the present invention, but are not intended to limit the protection scope of the present invention. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method, comprising:
   receiving, by a terminal, jointly encoded control information for an uplink subframe from a base station, wherein the jointly encoded control information is jointly encoded first control information and second control information, the first control information comprises a first starting time indicating a starting position when the uplink subframe is available for the terminal to start signal transmission, and the second control information comprises a type of clear channel assessment (CCA) for the uplink subframe; and
   in response to the jointly encoded control information, performing, by the terminal, listen before talk (LBT), and when the LBT succeeds, sending, by the terminal, a signal by occupying the uplink subframe; or
   in response to the jointly encoded control information, sending, by the terminal, the signal by occupying the uplink subframe without performing LBT in the uplink subframe.

2. The method according to claim 1, wherein:
   the first control information indicates that a first starting time is the same as a second starting time, wherein the first starting time indicates a starting position when the uplink subframe is available for the terminal to start signal transmission, and the second starting time is a starting time of the uplink subframe; and
   the second control information indicates that a type of CCA for the uplink subframe is a single timeslot-based CCA.

3. The method according to claim 2, wherein:
   sending, by the terminal, the signal by occupying the uplink subframe without performing LBT in the uplink subframe comprises: if the terminal occupies a channel before the second starting time, sending, by the terminal, the signal started at the second starting time without performing LBT in the uplink subframe; or
   performing, by the terminal, the LBT comprises:
   if the terminal does not occupy a channel before the second starting time, the terminal performs the single timeslot-based CCA before the second starting time, and sending, by the terminal, the signal by occupying the uplink subframe, comprises: sending, by the terminal, the signal started at the second starting time.

4. The method according to claim 1, wherein:
   the first control information indicates that a first starting time is the same as a second starting time, wherein the first starting time indicates a starting position when the uplink subframe is available for the terminal to start signal transmission, and the second starting time is a starting time of the uplink subframe; and
   the second control information indicates that a type of CCA for the uplink subframe is random backoff-based CCA.

5. The method according to claim 4, wherein:
   sending, by the terminal, the signal by occupying the uplink subframe without performing LBT in the uplink subframe comprises: if the terminal occupies a channel before the second starting time, sending, by the terminal, the signal started at the second starting time without performing LBT in the uplink subframe; or
   performing, by the terminal, the LBT comprises:
   if the terminal does not occupy a channel before the second starting time, the terminal performs the random backoff-based CCA before the second starting time, and sending, by the terminal, the signal by occupying the uplink subframe, comprises: sending, by the terminal, the signal started at the second starting time.

6. The method according to claim 1, wherein:
   the first control information indicates that the first starting time is after a second starting time, wherein an interval between the first starting time and the second starting time is a third time, and the second starting time is a starting time of the uplink subframe; and
   the second control information instructs the terminal to skip performing LBT and to send the signal by occupying the uplink subframe.

7. An apparatus, comprising:
   a transmitter; a processor; and
   a receiver configured to receive jointly encoded control information for an uplink subframe from a base station, wherein the jointly encoded control information is jointly encoded first control information and second control information, the first control information comprises a first starting time indicating a starting position when the uplink subframe is available for the terminal to start signal transmission, the second control information comprises a type of clear channel assessment (CCA) for the uplink subframe;
   in response to the jointly encoded control information, the processor controls the receiver to perform listen before talk (LBT), and when the LBT succeeds, the transmitter is configured to send a signal by occupying the uplink subframe; or
   in response to the jointly encoded control information, the transmitter is configured to send the signal by occupying the uplink subframe without performing LBT in the uplink subframe.

8. The apparatus according to claim 7, wherein:
the first control information indicates that a first starting time is the same as a second starting time, wherein the first starting time indicates a starting position when the uplink subframe is available for the apparatus to start signal transmission, and the second starting time is a starting time of the uplink subframe; and
the second control information indicates that a type of CCA for the uplink subframe is a single timeslot-based CCA.

9. The apparatus according to claim 8, wherein:
the transmitter being configured to send the signal by occupying the uplink subframe without performing LBT in the uplink subframe comprises: if the apparatus occupies a channel before the second starting time, sending, by the transmitter, the signal started at the second starting time without performing LBT in the uplink subframe; or
the processor controls the receiver to perform LBT, comprising: if the apparatus does not occupy a channel before the second starting time, the processor controls the receiver to perform the single timeslot-based CCA before the second starting time, and the transmitter being configured to send the signal by occupying the uplink subframe comprises: sending, by the transmitter, the signal started at the second starting time.

10. The apparatus according to claim 7, wherein:
the first control information indicates that a first starting time is the same as a second starting time, wherein the first starting time indicates a starting position when the uplink subframe is available for the apparatus to start signal transmission, and the second starting time is a starting time of the uplink subframe; and
the second control information indicates that a type of CCA for the uplink subframe is random backoff-based CCA.

11. The apparatus according to claim 10, wherein:
the transmitter being configured to send the signal by occupying the uplink subframe without performing LBT in the uplink subframe comprises: if the apparatus occupies a channel before the second starting time, sending, by the transmitter, the signal started at the second starting time without performing LBT in the uplink subframe; or
the processor controls the receiver to perform LBT, comprising: if the apparatus does not occupy a channel before the second starting time, the processor controls the receiver to perform the random backoff-based CCA before the second starting time, and the transmitter being configured to send the signal by occupying the uplink subframe comprises: sending, by the transmitter, the signal started at the second starting time.

12. The apparatus according to claim 7, wherein:
the first control information indicates that the first starting time is after a second starting time, wherein an interval between the first starting time and the second starting time is a third time, and the second starting time is a starting time of the uplink subframe; and
the second control information instructs the apparatus to skip performing LBT and to send the signal by occupying the uplink subframe.

13. A non-transitory computer readable storage medium, comprising computer program codes which when executed by a computer processor cause the processor to facilitate performing:
receiving jointly encoded control information for an uplink subframe from a base station, wherein the jointly encoded control information is jointly encoded first control information and second control information, wherein the first control information comprises a first starting time, wherein the first starting time indicating a starting position when the uplink subframe is available for the terminal to start signal transmission, the second control information comprises a type of clear channel assessment (CCA) for the uplink subframe; and
in response to the jointly encoded control information, performing listen before talk (LBT), and when the LBT succeeds, sending a signal by occupying the uplink subframe; or
in response to the jointly encoded control information, sending the signal by occupying the uplink subframe without performing LBT in the uplink subframe.

14. The non-transitory computer readable storage medium according to claim 13, wherein:
the first control information indicates that a first starting time is the same as a second starting time, wherein the first starting time indicates a starting position when the uplink subframe is available for the processor to facilitate signal transmission, and the second starting time is a starting time of the uplink subframe; and
the second control information indicates that a type of CCA for the uplink subframe is a single timeslot-based CCA.

15. The non-transitory computer readable storage medium according to claim 14, wherein:
sending the signal by occupying the uplink subframe without performing LBT in the uplink subframe comprises: if the compute processor occupies a channel before the second starting time, sending the signal started at the second starting time without performing LBT in the uplink subframe; or
performing the LBT comprises:
if the processor does not occupy a channel before the second starting time, performing the single timeslot-based CCA before the second starting time, and sending the signal by occupying the uplink subframe comprises: sending the signal started at the second starting time.

16. The non-transitory computer readable storage medium according to claim 13, wherein:
the first control information indicates that a first starting time is the same as a second starting time, wherein the first starting time indicates a starting position when the uplink subframe is available for the processor to facilitate signal transmission, and the second starting time is a starting time of the uplink subframe; and
the second control information indicates that a type of CCA for the uplink subframe is random backoff-based CCA.

17. The non-transitory computer readable storage medium according to claim 16, wherein:
sending the signal by occupying the uplink subframe without performing LBT in the uplink subframe comprises: if the compute processor occupies a channel before the second starting time, sending the signal started at the second starting time; or
performing the LBT comprises:
if the processor does not occupy a channel before the second starting time, performing the random backoff-based CCA before the second starting time, and sending the signal by occupying the uplink subframe comprises: sending the signal started at the second starting time.

\* \* \* \* \*